United States Patent
Brooks et al.

(10) Patent No.: US 7,889,765 B2
(45) Date of Patent: Feb. 15, 2011

(54) APPARATUS AND METHODS FOR UTILIZING VARIABLE RATE PROGRAM STREAMS IN A NETWORK

(75) Inventors: Paul D. Brooks, Weddington, NC (US); Remi Rieger, Charlotte, NC (US)

(73) Assignee: Time Warner Cable Inc., New York, NY (US)

( * ) Notice: Subject to any disclaimer, the term of this patent is extended or adjusted under 35 U.S.C. 154(b) by 1470 days.

(21) Appl. No.: 11/291,328

(22) Filed: Nov. 30, 2005

(65) Prior Publication Data

US 2007/0121678 A1  May 31, 2007

(51) Int. Cl.
*H04J 3/07* (2006.01)
(52) U.S. Cl. .................... 370/505; 370/506
(58) Field of Classification Search .............. 370/464, 370/465, 474, 476, 477, 479, 498, 521, 529, 370/537, 505, 506; 725/32, 34, 35, 36, 87–92, 725/101–102, 151; 348/384, 423
See application file for complete search history.

(56) References Cited

U.S. PATENT DOCUMENTS

| | | | |
|---|---|---|---|
| 4,594,708 A | 6/1986 | Servel et al. | |
| 5,606,359 A | 2/1997 | Youden et al. | |
| 5,650,825 A * | 7/1997 | Naimpally et al. | 348/465 |
| 5,708,961 A | 1/1998 | Hylton et al. | |
| 5,818,438 A | 10/1998 | Howe et al. | |
| 5,872,588 A | 2/1999 | Aras et al. | |
| 5,917,830 A * | 6/1999 | Chen et al. | 370/487 |
| 6,047,007 A | 4/2000 | Munday et al. | |
| 6,072,982 A | 6/2000 | Haddad | |
| 6,198,478 B1 | 3/2001 | Ota et al. | |
| 6,205,525 B1 * | 3/2001 | Korst | 711/154 |
| 6,480,521 B1 * | 11/2002 | Odenwalder et al. | 375/130 |
| 6,510,556 B1 | 1/2003 | Kusaba et al. | |
| 6,771,657 B1 * | 8/2004 | Elstermann | 370/465 |
| 6,807,528 B1 | 10/2004 | Truman et al. | |
| 6,889,382 B1 | 5/2005 | Anderson | |
| 6,895,544 B1 | 5/2005 | Park et al. | |
| 6,924,847 B2 | 8/2005 | Choi et al. | |
| 6,996,129 B2 * | 2/2006 | Krause et al. | 370/487 |
| 7,003,790 B1 | 2/2006 | Inoue et al. | |
| 7,016,337 B1 * | 3/2006 | Wu et al. | 370/352 |
| 7,103,047 B1 | 9/2006 | Wing Field | |
| 7,248,590 B1 | 7/2007 | Liu | |
| 7,286,571 B2 | 10/2007 | Mailhot | |
| 7,333,515 B1 | 2/2008 | Ramakrishnan | |

(Continued)

*Primary Examiner*—Ayaz R Sheikh
*Assistant Examiner*—Chuong T Ho
(74) *Attorney, Agent, or Firm*—Gazdzinski & Associates, PC

(57) ABSTRACT

Apparatus and methods for transparently using otherwise wasted bandwidth associated with variable-rate program streams to deliver additional content. In one embodiment, the network comprises a broadcast switched architecture (BSA), and the program streams are loaded up to a target rate using "null" packets and then delivered over the network infrastructure to a plurality of hub sites. The streams are then unloaded to reproduce the original variable streams, and the bandwidth vacated by removal of the null packets used as the transport mechanism for additional (e.g., non time-sensitive) content to be delivered to the subscribers. The process can also be substantially automated and anticipatory (through, e.g., transmission of null bit insertion data downstream). The invention can also advantageously be implemented with minimal modifications to existing infrastructure, and supports business and operational supervisory processes. Network server, QAM modulator, and CPE apparatus implementing the aforementioned methodologies are also disclosed.

30 Claims, 14 Drawing Sheets

U.S. PATENT DOCUMENTS

| | | |
|---|---|---|
| 7,349,386 B1 | 3/2008 | Gou |
| 7,376,159 B1* | 5/2008 | Stanger et al. ............... 370/528 |
| 2002/0059626 A1 | 5/2002 | Lemmons |
| 2002/0101921 A1 | 8/2002 | Golin |
| 2002/0146023 A1* | 10/2002 | Myers ........................ 370/412 |
| 2002/0147991 A1 | 10/2002 | Furlan et al. |
| 2002/0156915 A1 | 10/2002 | Haggar et al. |
| 2002/0166121 A1 | 11/2002 | Rovira |
| 2003/0056217 A1 | 3/2003 | Brooks |
| 2003/0217365 A1 | 11/2003 | Caputo |
| 2004/0205829 A1* | 10/2004 | Hane, III .................... 725/135 |
| 2005/0010960 A1 | 1/2005 | Kitazawa et al. |
| 2005/0055685 A1 | 3/2005 | Maynard |
| 2005/0100076 A1 | 5/2005 | Gazdzinski et al. |
| 2005/0108763 A1 | 5/2005 | Baran et al. |
| 2005/0122999 A1 | 6/2005 | Scherzer et al. |
| 2006/0020983 A1 | 1/2006 | Shau |
| 2006/0088063 A1* | 4/2006 | Hartung et al. ............. 370/498 |
| 2006/0130113 A1 | 6/2006 | Carlucci |
| 2006/0171423 A1 | 8/2006 | Helms |
| 2007/0022459 A1 | 1/2007 | Gaebel |
| 2007/0076728 A1 | 4/2007 | Rieger |
| 2008/0192820 A1* | 8/2008 | Brooks et al. .......... 375/240.02 |

\* cited by examiner

APPARATUS AND METHODS FOR UTILIZING VARIABLE RATE PROGRAM STREAMS IN A NETWORK

RELATED APPLICATIONS

This application is related to co-owned and co-pending U.S. application Ser. No. 11/048,334 filed Feb. 1, 2005 and entitled "APPARATUS AND METHODS FOR MULTI-STAGE MULTIPLEXING IN A NETWORK", which is incorporated herein by reference in its entirety.

BACKGROUND OF THE INVENTION

1. Field of Invention

The present invention relates generally to the field of network bandwidth utilization, and specifically in one aspect to using variable bit rate streams on the network in order to provide support for services over a content-based network such as a cable television network.

2. Description of Related Technology

One significant competitive challenge presently faced by network operators relates to managing and conserving bandwidth while maintaining sufficient signal quality to subscribers. This includes the reclamation of otherwise under-utilized or unused bandwidth such that the service and/or customer base can be expanded without significant modifications or build-outs of the underlying network infrastructure. For example, it is clearly desirable to expand the types and availability of "next-generation" network services, including high-definition (HD) broadcast, VOD, high-speed data, VoIP, Interactive TV (e.g., "eTV"), etc. over time, without the need for major capital expenditures or system modifications. Hence, network operators are increasingly focused on techniques for squeezing as much capacity out of their existing networks as possible.

The foregoing need for bandwidth optimization and reclamation is also applicable to so-called "switched" network architectures. These architectures generally distribute all of the available content provided by the network operator (e.g., MSO) to switches within the network; these switches are then used to selectively provide only those channels actually watched or requested by users to their hubs or nodes for delivery, thereby effectively deleting unwatched channels from the digital broadcast stream. A "deleted" channel is automatically switched back on when a subscriber subsequently selects it, with the switching and delivery transition being for all intents and purposes transparent to the subscriber. This approach has obvious benefits from the standpoint of bandwidth conservation.

In the exemplary switched broadcast network architecture, it is often necessary to fix a certain bandwidth of each acquired program stream. Digital program streams are acquired in the head end of the network and include various components, including: (i) a video portion, (ii) an audio portion, and (iii) a data portion. Each one of these components consumes a certain bandwidth that changes over time in a generally non-predicable manner. The requirement to fix the bandwidth per stream stems from the desire to maintain a substantially known or constant bit rate for purposes of allocation and reallocation of specific resource size increments. This allows, inter alia, for the insertion and removal of streams by, e.g., servers in broadcast switched digital architectures. For example, in a typical broadcast switched architecture (BSA) network, the total bandwidth allocated to a program stream (all components) in standard definition (SD) is "clamped" at 3.75 Mbps.

By clamping the rate at a fixed value, excess bandwidth will sometimes be allocated to streams which do not require the full amount of bandwidth. In the context of the foregoing example, such a program stream might only require 3.25 Mbps peak, but is none-the-less allocated 3.75 Mbps. This added bandwidth takes the form typically of inserted "null" packets which are loaded into each variable program stream in order to achieve the "constant" rate (e.g., 3.75 Mbps). These null packets are typically inserted at the rate clamping processor. The constant bit rate (CBR) streams including the null data are examined, and the null packets identified and removed (e.g., at the hub site or other distribution node).

Also, the aforementioned "constant" bit rates must be chosen to envelope possible rate peaks in the program material to prevent deleterious artifacts, thereby requiring that the constant rate selected often be significantly higher that what is actually required at any given time.

However, since the rate at which null packets are packed into the variable streams before transport can change significantly, the prior art merely identifies and removes the null packets from the program streams (e.g., at the hub), and does not make any attempt to utilize the bandwidth vacated by removal of the null packets for transmission of additional data. Furthermore, since this vacated bandwidth varies as a function of time, it is unpredictable in terms of availability, and hence ostensibly is not suited to supporting a time-sensitive (e.g., real time) data stream such as streaming video or audio.

Various prior art approaches to smoothing out the variability in bit streams in general are known. For example, U.S. Pat. No. 4,594,708 to Servel, et al. issued Jun. 10, 1986 entitled "Synchronization for a digital train intended for a correct framing of received information" discloses a digital train that is synchronized to correct the framing of received information. To this end, the transmitted digital train is timely structured into recurrent time intervals having a fixed length. The information to be transmitted is divided into blocks called packets, having the length of a time interval and comprising a field of data and a header used for identifying the packets. A digital transmission system with a TDM multiplex is divided into equal and recurrent time intervals, wherein the information is indexed by an associated explicit header, and wherein the absence of information in a time interval is indexed by a specific header which is not used elsewhere as a header. Null bits and bytes are utilized as part of the packetization process.

U.S. Pat. No. 6,047,007 to Munday, et al. issued Apr. 4, 2000 entitled "Transmission of data on multirate networks" discloses mobile radio units that communicate at a lower bit-rate than the conventional switching rate of a fixed network. Such calls are identified by mobile-to-mobile recognizers which identify characteristic bit streams and handle calls appropriately. An incoming mobile-to-mobile recognizer normally routes the call to a digital-to-A-law transcoder. An outgoing mobile-to-mobile recognizer normally routes calls to a high bit-rate digital-to-A-law transcoder. If a call is established between two mobile users the first mobile-to-mobile recognizer diverts the signal received to a bit stuffer which provides three null bits for every bit received over the air interface. The null bits may be random numbers, but preferably include a recognizable pattern which can be detected by the second mobile-to-mobile recognizer. By such "bit stuffing" a 64 kbit/s signal can be generated from a 16 kbit/s signal with minimal signal processing and without the need to transcode to A-law and back.

U.S. Pat. No. 6,807,528 to Truman, et al. issued Oct. 19, 2004 entitled "Adding data to a compressed data frame" discloses apparatus for use of otherwise wasted bits in a bit stream. Many low bit rate digital audio encoding systems, including Dolby Digital and MPEG-2 AAC generate data streams in which unused dummy, fill, stuffing, or null bits exist whenever the bit allocation function in the encoder does not utilize all available bits from a bit pool. In the invention, all or some of such wasted bits are used to carry information. This can be accomplished after an encoder generates a bitstream. The resulting bitstream is analyzed to identify the locations of some or all of the unused bits. Some or all of the identified unused bits are then replaced with information-carrying bits to embed information-carrying bits in locations formerly occupied by unused bits. Alternatively, instead of replacing some or all unused bits in the bitstream with information-carrying bits after encoding, a modified encoder may insert information-carrying bits in some or all of the unused bit positions during the encoding process.

U.S. Pat. No. 6,895,544 to Park, et al. issued May 17, 2005 entitled "Encoding method of multimedia data and encoding device therefore" discloses an encoding method for wireless transceiving of multimedia data including video data, and an encoding device therefor. The encoding method includes (a) generating a length field representing the number of bits of a payload, (b) generating an error correction code by performing error correction coding with respect to the length field, and (c) inserting the length field and the error correction code during radio link protocol (RLP) framing. The encoding method reduces overhead when multimedia data including video data is transmitted and received under the radio environment, and increases error robustness, thereby improving the quality of an image. The encoding method further includes a step of generating a null indication field indicating an existence of only null data, if only null data exists without information data. Preferably, the method further includes steps of performing RLP framing for a fixed-length RLP frame and inserting into the frame a series of fill bits having a constant binary value during the RLP framing to achieve byte alignment to complete the fixed length.

U.S. Pat. No. 6,924,847 to Choi, et al. issued Aug. 2, 2005 entitled "VSB reception system with enhanced signal detection for processing supplemental data" discloses a VSB reception system that includes a sequence generator for decoding a symbol corresponding to the supplemental data and generating a predefined sequence included in the supplemental data at VSB transmission system. The reception system also includes a modified legacy VSB receiver for processing the data received from the VSB transmission system in a reverse order of the VSB transmission system by using the sequence, and a demultiplexer for demultiplexing the data from the modified legacy VSB receiver into the MPEG data and the supplemental data. The VSB reception system also includes a supplemental data processor for processing the supplemental data segment from the demultiplexer in a reverse order of the transmission system, to obtain the supplemental data, thereby carrying out the slicer prediction, decoding, and symbol decision more accurately by using the predefined sequence, to improve a performance.

U.S. Patent Application Publication No. 20020101921 to Golin, published Aug. 1, 2002 entitled "Controlling a video-buffer-verifier buffer using an MPEG-like encoder" discloses control of possible overflow of a video buffer verifier (VBV) buffer employed in MPEG-like video encoders by controlling bits being drained from a video encoder buffer (eBuff). Specifically, a number of bits in the encoder buffer is determined when a last prior picture ends, or when it should end. This number of bits (maxBits) is the maximum number of bits to be read from the encoder buffer and written to the remote decoder before a prescribed time T(n). When maxBits has been read from the encoder buffer and written to the decoder, the writing of bits to the remote decoder is stopped until the process is reset. The disclosed encoder also pads the encoded bitstream with null bits under certain circumstances.

U.S. Patent Application Publication No. 20020147991 to Furlan, et al. published Oct. 10, 2002 entitled "Transmission of panoramic video via existing video infrastructure" discloses technology that allows an immersive video to be transmitted from a first site to a second site using standard television infrastructure. Each frame of the immersive video is packed into at least one standard television frame. The standard television frame is suitable for transmission using standard television infrastructure. Once the standard television frame is received at the second site, the immersive video frame is reconstructed. The reconstructed immersive video frame can then be transmitted, recorded, viewed, or used to generate a view for transmission or recording.

U.S. Patent Application Publication No. 20020156915 to Haggar, et al. published Oct. 24, 2002 entitled "Technique for efficient data transfer within a virtual network" discloses methods, systems, and computer program products for improving the efficiency of data transfer within interconnected components of a virtual network, and in particular components of a single physical computing device, where the components exchange data as if they were communicating over an actual communications network using networking protocols. Data packets to be sent from one component to another are buffered by next-hop address (and optionally by final destination address as well) to improve efficiency of packet delivery. In one embodiment, outbound packing buffers are logically divided into a plurality of frames, the frames being associated with network addresses. The packing operation comprises packing the outbound data packets into selected frames of selected ones of the outbound packing buffers when a header of the outbound data packet to be packed specifies a first network address and a second network address which correspond to the selected outbound packing buffer and the selected frame.

U.S. Patent Application Publication No. 20050010960 to Kitazawa, et al. published Jan. 13, 2005 entitled "Video data multiplexing device, video data multiplexing control method, encoded stream multiplexing device and method, and encoding device and method" discloses the transmission of data for statistical multiplexing which is required for control using statistical multiplexing. By utilizing private packets, respective encoding devices transmit encoding difficulties serving as the data for statistical multiplexing to a multiplexer via the same transmission channels as encoded video data and audio data are transmitted. The multiplexer conducts multiplexing processing on data supplied from the respective encoding devices at a first rate R1 larger than a transmission rate on a transmission channel of a subsequent stage, and outputs a transport stream ($TS_d$) including the private packets to a statistical multiplexing computer. In addition, the multiplexer conducts multiplexing processing on data obtained by removing the private packets, at a second rate R2 which is equal to the transmission rate on the transmission channel of the subsequent stage, and outputs a transport stream ($TS_m$) which does not include the private packets to the transmission channel of the subsequent stage.

U.S. Patent Application Publication No. 20050100076 to Gazdzinski, et al. published May 12, 2005 entitled "Adaptive holographic wideband communications apparatus and methods" discloses apparatus and methods for utilizing holographic waveforms for a variety of purposes including communication. In one exemplary embodiment, the holographic waveforms are transmitted over an RF bearer medium to provide, inter alia, covert and robust communications. Frame "packing" or stuffing is disclosed; a constant or variable frame size is generated, and the frames stuffed up to capacity before transform and subsequent transmission. One embodiment uses a constant frame size; this approach maintains a constant frame size and frame rate, thereby in effect generating a somewhat unchanging signal emission in both the time and frequency domains. Other schemes for frame stuffing or padding are disclosed, including constant overhead byte stuffing (COBS) and zero-bit stuffing. Where the source or input data rate is insufficient to stuff the bits, such as where a non-continuous data source is utilized, either the coding rate may be adjusted (such as via a coding rate control algorithm which calculates the required coding rate necessary to maintain proper frame stuffing), and/or the data buffered (such as in a FIFO or comparable mechanism). Additionally, "stuff data" can be spontaneously generated and inserted into the frame structure as necessary to avoid use of variable code rates or buffering.

U.S. Patent Application Publication No. 20050122999 to Scherzer, et al. published Jun. 9, 2005 entitled "System and method for interference mitigation for wireless communication" discloses systems and methods which provide interference mitigation by making alternative resources available within areas served by wireless communication links. Embodiments provide multiple channel availability in establishing wireless communication links to facilitate interference mitigation. A frame aggregator/de-aggregator unit provides packing and unpacking of frames. Accordingly, packed frames are passed between frame aggregator/de-aggregator unit and encoder/decoder If there is not enough data for the fixed size frame, additional null bits may be concatenated as needed according to one embodiment.

Despite the foregoing broad variety of techniques for frame and packet "stuffing", no suitable approach or apparatus for use of the bandwidth created by removal of the null or stuffed bits from bit streams or data structures is disclosed in the prior art. In the particular context of a content-based network, this bandwidth is effectively wasted, thereby reducing the efficiency of the network as a whole.

Hence, there is a salient need for improved apparatus and methods for making effective use of variations in data or program stream bit rate, and the aforementioned vacated bandwidth. Such improved apparatus and methods would ideally be applicable over a wide range of variable bit rates produced by, e.g., interactive applications used by the subscribers, while maintaining high video and audio data quality. Such improved apparatus and methods would also be substantially implemented using existing network infrastructure, without the need for large-scale or costly modifications or additions thereto.

SUMMARY OF THE INVENTION

The present invention satisfies the foregoing needs by providing improved apparatus and methods for using content or program stream bit rate variations to deliver additional data or information over a content-based network (such as a cable or satellite network).

In a first aspect of the invention, a method of operating a content-based network is disclosed. In one embodiment, the method comprises: receiving a plurality of variable-rate content streams at a first node of the network; determining at least one constant bit rate for the plurality of streams; inserting null data into respective ones of the streams based at least in part on the constant bit rate; transmitting the streams over the network to a distribution node; removing the null data from at least one of the streams; inserting second data with the at least one stream substantially in place of bandwidth of the null data; and distributing the at least one stream and second data to at least one subscriber of the network.

In another embodiment, the method comprises: receiving a plurality of variable-rate content streams at a first node of the network; determining a target bit rate for the plurality of streams; determining a required bit rate for each of the streams; determining the amount of null data to be inserted into each of the streams based at least in part on the target bit rate and respective ones of the required bit rates; inserting the null data into respective ones of the streams to produce a plurality of substantially constant rate streams; transmitting the substantially constant rate streams over the network to a distribution node; removing the null data from each of the substantially constant rate streams to substantially recover the variable rate streams; inserting additional data either into the recovered streams, or in one or more new streams, in place of at least a portion of the bandwidth associated with the removed null data; and distributing the streams, and the additional data, to a plurality of subscribers of the network.

In yet another embodiment, the method comprises: providing information regarding at least one rate associated with a plurality of variable rate content streams as a function of time; providing a maximum rate associated with the streams; inserting data substantially in place of available bandwidth based at least in part on the information and the maximum rate; and distributing the streams and data to at least one subscriber of the network.

In still a further embodiment, the method comprises: receiving a plurality of variable-rate content streams having a plurality of null data associated therewith; removing the null data from at least one of the streams; inserting second data with the at least one stream substantially in place of bandwidth of the null data; and distributing the at least one stream and second data to at least one subscriber of the network.

In another variant thereof, the inserting of additional data either into the recovered streams, or in one or more new streams, comprises forming one or more additional transport streams substantially separate from the recovered streams, and the act of distributing the streams, and the additional data, to the plurality of subscribers comprises transmitting the recovered streams and additional transport streams over one or more QAM channels.

In a second aspect of the invention, a method of transmitting both time-sensitive and non-time sensitive content over at least a portion of a content-based network is disclosed. In one embodiment, the method comprises: receiving a plurality of variable-rate content streams at a first node of the network, the streams comprising time-sensitive content; inserting a plurality of null data into at least one of the streams to produce one or more streams having a target bit rate; transmitting the streams over the network to a distribution node; removing the null data from each of the streams to substantially reproduce the original streams; and transmitting non-time sensitive content along with the substantially reproduced streams on an as-available basis.

In a third aspect of the invention, apparatus for optimizing bandwidth utilization in network is disclosed. In one embodiment, the network comprises a broadcast switched, content-based network having at least one content transmission node and a plurality of hub sites, and the apparatus comprises: a distribution-side process running on the at least one transmission node and adapted to receive a plurality of variable rate streams the data, the process being adapted to dynamically load at least some of the streams with a plurality of non-content data in order to achieve a substantially constant data rate for the streams; a combining process adapted to combine the plurality of loaded streams onto a transport means for transmission to the hub sites; a recovery process adapted to recover the plurality of loaded streams from the transport means; a removal process adapted to remove at least a portion of the non-content data; and an insertion process adapted to insert secondary data along with the streams. Insertion of the secondary content is based at least in part on the volume or rate of the non-content data loaded into the streams by the distribution-side process.

In a fourth aspect of the invention, modulator apparatus adapted for use in a network is disclosed. In one embodiment, the network comprises a broadcast switched digital network having a distribution network in communication therewith and being adapted to carry a plurality of program streams, and the apparatus comprises: a processor; a storage device in data communication with the processor; a network interface adapted to at least receive loaded program streams from the distribution network; and a computer program operative to run on the modulator apparatus. The computer program is adapted to: receive the plurality of program streams; identify and remove null data loaded into the loaded streams to obtain original variable rate streams therefrom; insert secondary content along with the obtained variable rate streams; and transmit the variable bit rate streams and the secondary content to a plurality of client devices downstream of the modulator apparatus.

In a fifth aspect of the invention, a method of operating a content-based network so as to minimize wasted bandwidth is disclosed. In one embodiment, the method comprises: receiving a plurality of variable-rate content streams at a first node of the network; inserting a plurality of overhead into respective ones of at least some of the streams to produce substantially constant rate streams; transmitting the substantially constant rate streams over the network to a distribution node; removing the overhead from at least one of the substantially constant rate streams; inserting data with the at least one stream substantially to occupy the bandwidth previously occupied by the overhead; and distributing the at least one stream to at least one subscriber of the network. In one variant, the method further comprises: receiving information relating to the act of inserting a plurality of overhead before the act of inserting data is performed; and coordinating the removing of the overhead and the inserting data based at least in part on the information, the coordinating comprising both substantially matching a rate of the inserting data to a rate of removing the overhead and substantially synchronizing the removing overhead and inserting data.

In a sixth aspect of the invention, consumer premises equipment adapted for use in a cable network is disclosed. In one embodiment the equipment comprises: a processor; a storage device in data communication with the processor; a network interface in signal communication with the processor, the interface adapted to receive one or more signal streams from the cable network, the signal streams comprising primary content and non-time sensitive secondary content; and a computer program operative to run on the processor. In one variant, the computer program is configured to: identify at least a portion of the secondary content associated with the one or more streams; extract the identified at least portion of the secondary content; and/store at least a portion of the extracted content in the storage device.

In a seventh aspect of the invention, a method of doing business within a content based network is disclosed. In one embodiment, the network is adapted to provide a plurality of variable rate program streams having at least video and audio portions to a plurality of subscribers having a client device coupled to the network, and the method comprises: selectively adding overhead to at least a portion of the streams to produce second streams; transmitting the second streams to a distribution node of the network; removing at least a portion of the overhead from the second streams; selectively inserting secondary data along with the at least video and audio portions to create third streams; and transmitting the third streams to at least one of the plurality of subscribers; wherein the act of selectively inserting is performed substantially in response to the at least one subscriber selecting the secondary data for download.

In an eighth aspect of the invention, a method of providing primary and secondary content to at least one user of a content-based network is disclosed. In one embodiment, the method comprises: providing a plurality of primary content; associating each of the plurality of content with a respective program transport streams; inserting a plurality of overhead into at least a portion of the streams in order to establish a substantially constant data rate; combining the program transport streams, including the overhead, together; transmitting the combined streams to a node of the network; removing at least a portion of the overhead; inserting secondary content for delivery with the program transport streams, the secondary content being inserted substantially in place of the removed at least portion of the overhead; and transmitting the program transport streams and the secondary content, to the at least one user.

In a ninth aspect of the invention, network apparatus for use in a content-based network is disclosed. In one embodiment, the apparatus if adapted for receiving streams containing content and for transmitting secondary data to a set of customer premises equipment, and the network apparatus comprises: receiving apparatus adapted to receive a plurality of substantially constant rate data streams, the stream each including a variable rate stream and a plurality of null data; processing apparatus adapted to remove at least a portion of the null data to substantially recover the variable rate streams, and insert secondary data at least along with the recovered streams; and a server for supplying the secondary data to the processing apparatus.

In a tenth aspect of the invention, a cable television network for delivering television programming and non-time sensitive data to one or more subscriber premises equipment is disclosed. In one embodiment, the cable television network comprises: a process configured to receive programming at variable data rates in the form of variable program streams, and for inserting stuffing packets therein to generate a plurality of substantially constant program streams; a server configured to provide non-time sensitive data; and apparatus adapted to: remove the stuffing packets from the substantially constant streams to substantially recover the variable streams; and insert the non-time sensitive data at least along with the recovered variable program streams to generate data streams, the data streams each carrying at least one of the programming and the non-time sensitive data, for delivery to the premises equipment.

DETAILED DESCRIPTION OF THE INVENTION

Figure 1:
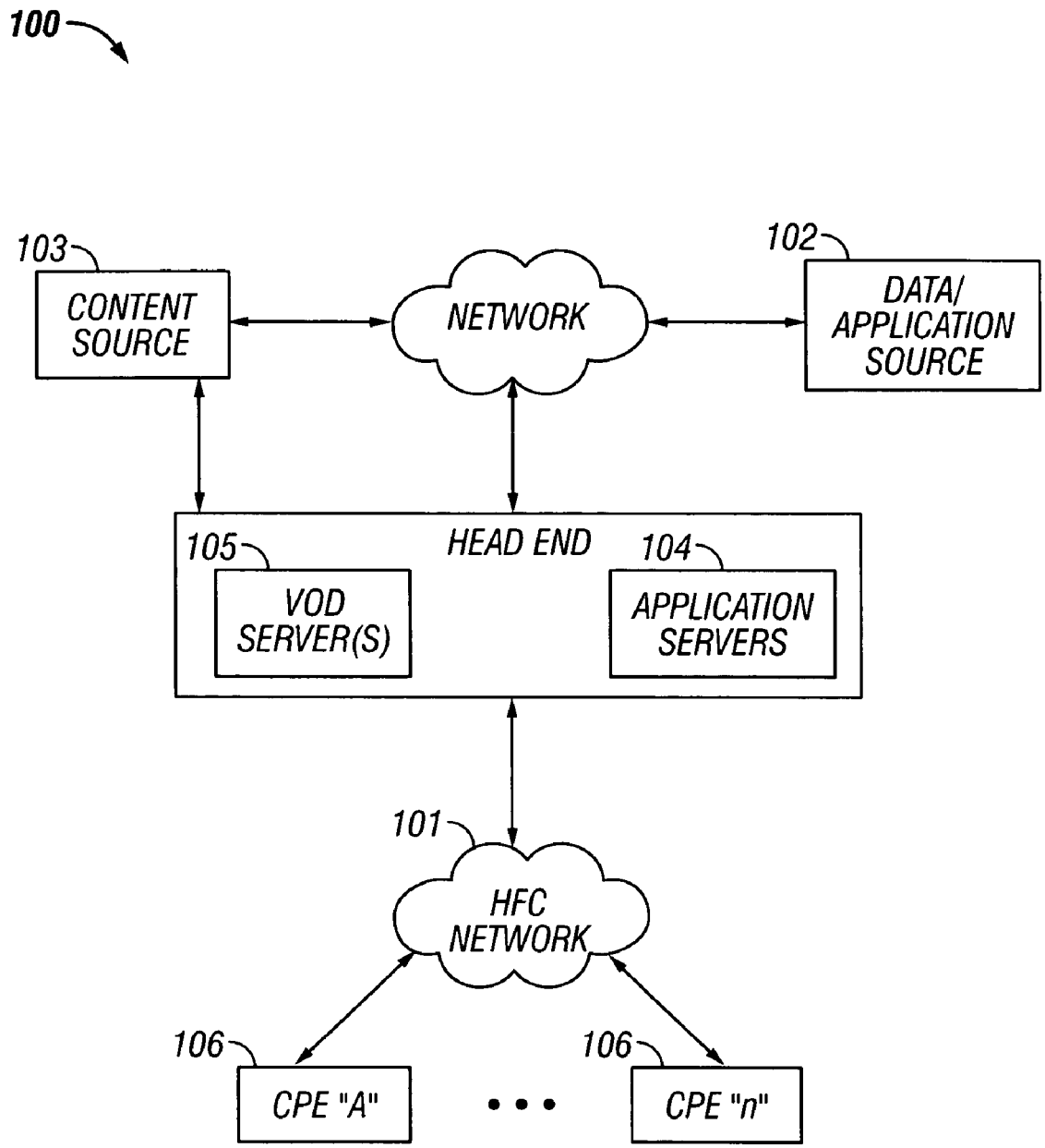
FIG. 1 is a functional block diagram illustrating an exemplary HFC cable network configuration useful with the present invention.

Reference is now made to the drawings wherein like numerals refer to like parts throughout.

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "QAM" refers to modulation schemes used for sending signals over cable networks. Such modulation scheme might use any constellation level (e.g. QAM-16, QAM-64, QAM-256 etc.) depending on details of a cable network. A QAM may also refer to a physical channel modulated according to the schemes.

As used herein, the term "Service Group" refers to either a group of service users (e.g. subscribers) or the resources shared by them in the form of entire cable RF signal, only the RF channels used to receive the service or otherwise treated as a single logical unit by the network for resource assignment.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "head-end" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/6XXX/8XXX series digital devices, personal digital assistants (PDAs) such as the Apple Newton®, "Palm®" family of devices, handheld computers, personal communicators such as the Motorola Accompli or V710, J2ME equipped devices, cellular telephones, wireless nodes, or literally any other device capable of interchanging data with a network.

Similarly, the terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "component" in the context of software refers generally to a unit or portion of executable software that is based on a related set of functionalities. For example, a component could be a single class in Java™ or C++. Similarly, the term "module" refers generally to a loosely coupled yet functionally related set of components.

As used herein, the term "server" refers to any computerized component, system or entity regardless of form which is adapted to provide data, files, applications, content, or other services to one or more other devices or entities on a computer network.

Overview

In one salient aspect, the present invention provides a means of transparently and opportunistically utilizing bandwidth reclaimed after removal of null or "stuffing" data inserted into a program stream for, inter alia, producing constant-rate streams. Typically, this bandwidth is largely variable and unpredictable, and hence is not utilized within systems such as cable television networks. The present invention, in contrast, makes use of this "transient" bandwidth to deliver one or more secondary content elements. These secondary content elements occupy the QAMs delivered to one or more subscriber's premises which also carry the primary or program content, thereby allowing for tandem use of existing QAMs.

The secondary content is, in the exemplary embodiment, non-time sensitive (i.e., does not have an intrinsic temporal relationship between delivery of its components, or need to maintain any relative or absolute timing). This is a result of the availability of the bandwidth created by the removal of the null data (e.g., packets) being highly variable, due to the variability of the actual bit rate with respect to the prescribed target bit rate for each of the program streams. However, with foreknowledge ("look-ahead") of variable stream rates, and the occurrence of a significant "window" of contiguous transient bandwidth, delivery of limited amounts of time-sensitive secondary content (e.g., limited based on the depth or size of the buffering employed) is also possible using the invention.

In one exemplary embodiment, the program streams are loaded using null data (or "overhead"), and delivered over the existing network infrastructure (e.g., optical DWDM portion of an HFC cable network) to a plurality of hub sites, wherein the streams are unloaded to reproduce the original variable bit rate stream. The variable streams are then "stuffed" with data of the secondary content, which may comprise for example data files (e.g., JPEGs, MPEGs, etc.), applications (such as files associated with gaming applications, interactive applications, etc.), electronic program guide updates, or any other structure which meets the criterion of being non-time sensitive.

In another embodiment, the secondary content is used to form one or more additional "program" transport streams aside from the variable streams, and both the variable streams and the new secondary content streams are delivered by way of the QAMs to the subscriber's premises.

The foregoing exemplary process is also substantially automated and opportunistic; the "vacated" bandwidth created by the removal of the null or stuff data from the program streams is automatically tracked, and an appropriate amount of secondary data inserted into the appropriate streams (i.e., variable streams, and/or new streams) before transmission over the QAMs to the subscriber(s). The process can also be made anticipatory in this fashion; e.g., one embodiment of the invention includes messaging between the bit-stuffing (and optional combination or encapsulation) process, such as at the head-end, and the hub where the secondary content is inserted, thereby allowing all processing necessary for secondary content insertion to be accomplished before or contemporaneous with the receipt of the program streams, thereby allowing for secondary content insertion with very little or no effective latency.

Algorithms for self-monitoring and bandwidth allocation based on, inter alia, data received from the cable receivers (e.g., DSTBs) are optionally utilized in another embodiment to allow the network (and opportunistic secondary content loading algorithms, or OSCLs) to more dynamically adjust to changing demand and operational conditions. When utilized in the context of broadcast switched architecture (BSA), the best of all worlds is obtained; i.e., (i) high bandwidth utilization efficiency (due to the inherent efficiencies of the BSA); (ii) dynamic and substantially automatic self-optimization of the network (including bandwidth allocation to the "variable" streams); and (iii) ability to carry secondary content within the recovered variable bit rate streams or new streams, thereby increasing the effective utilization of the available bandwidth all the way through to the end-user devices (CPE).

Furthermore, the foregoing functionality can be achieved with very minimal modifications to the existing network infrastructure, and is amenable to imposition of supervisory processes (such as so-called "business rules" engines) which form a logical layer on top of the variable rate secondary content loading algorithms.

Improved network server, QAM modulator, and consumer premises apparatus capable of implementing the aforementioned variable loading/unloading methodologies are also described.

Detailed Description of Exemplary Embodiments

Exemplary embodiments of the apparatus and methods of the present invention are now described in detail. While these exemplary embodiments are described in the context of the aforementioned hybrid fiber coax (HFC) cable architecture having an multiple systems operator (MSO), digital networking capability, and plurality of client devices/CPE, the general principles and advantages of the invention may be extended to other types of networks and architectures where bandwidth and program stream optimization are required or desirable, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over future satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

It is also noted that while the following discussion is cast primarily in terms of two service levels (i.e., SD and HD), the methods and apparatus disclosed herein can be extended to other numbers and types of service levels. For example, it is foreseeable that yet even higher levels of definition may be employed in the future (e.g., "ultra-high definition" or UHD), thereby allowing intelligent bandwidth conservation between three service levels (SD, HD, and UHD). As another option, multiple levels or rates may be present with one of the aforementioned service levels, such as where the SD level includes levels SD1, SD2, . . . SDn, and/or the HD level similarly includes HD1, HD2, . . . HDn, with each of these sub-levels having different data rates and/or other characteristics.

It is further noted that while described primarily in the context of 6 MHz RF QAM channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

FIG. 1 illustrates a typical content-based network configuration with which the variable loading utilization methodology of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 103, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The content source 103 may comprise any indigenous (i.e., MSO) or third party provider of content, whether direct or indirect. This content may comprise an MPEG (e.g., MPEG-2) stream, or otherwise. The content may also pass through one or more intermediary nodes or conditioning process before transmission over the network 101, as is well understood in the art.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. Such CPEs 106 comprise processors and associated computer memory adapted to store and run the downloaded or resident application, as well as receive the streamed in-band content. For example, "Watch TV" or similar applications or their components (or updates thereto) of the type described subsequently herein with reference to FIG. 5 can be downloaded to the CPE as required. For example, co-owned and co-pending U.S. patent application Ser. No. 10/655,655 filed Sep. 5, 2003 and entitled "Technique For Updating A Resident Application And Associated Parameters In A User Terminal Through A Communications Network", incorporated herein by reference in its entirety, describes one exemplary technique and architecture for updating applications resident on network CPE.

Figure 1A:
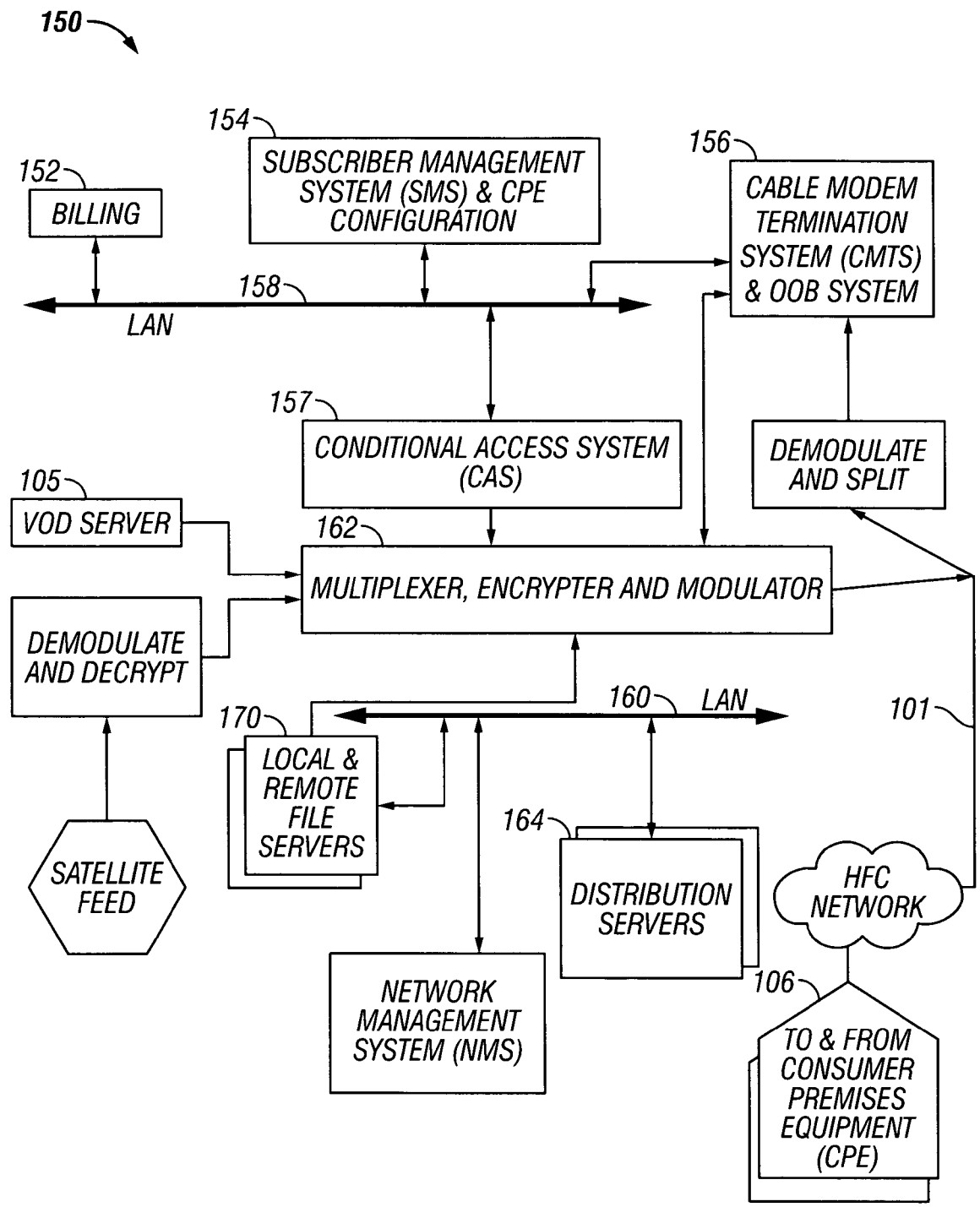
FIG. 1a is a functional block diagram illustrating one exemplary HFC cable network head-end configuration useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multi-plexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. The channels being delivered from the head-end 150 to the CPE 106 ("downstream") may be combined or multiplexed together in the head-end and sent to neighborhood hubs (FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the invention is in no way limited to these exemplary approaches.

In another embodiment, the network infrastructure includes one or more on-demand file or "carousel" functions. The present invention contemplates that not only will more traditional movie (e.g., MPEG) broadcast data be delivered though the variable loading compensation mechanisms described herein, but also data for interactive applications or other types of applications.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
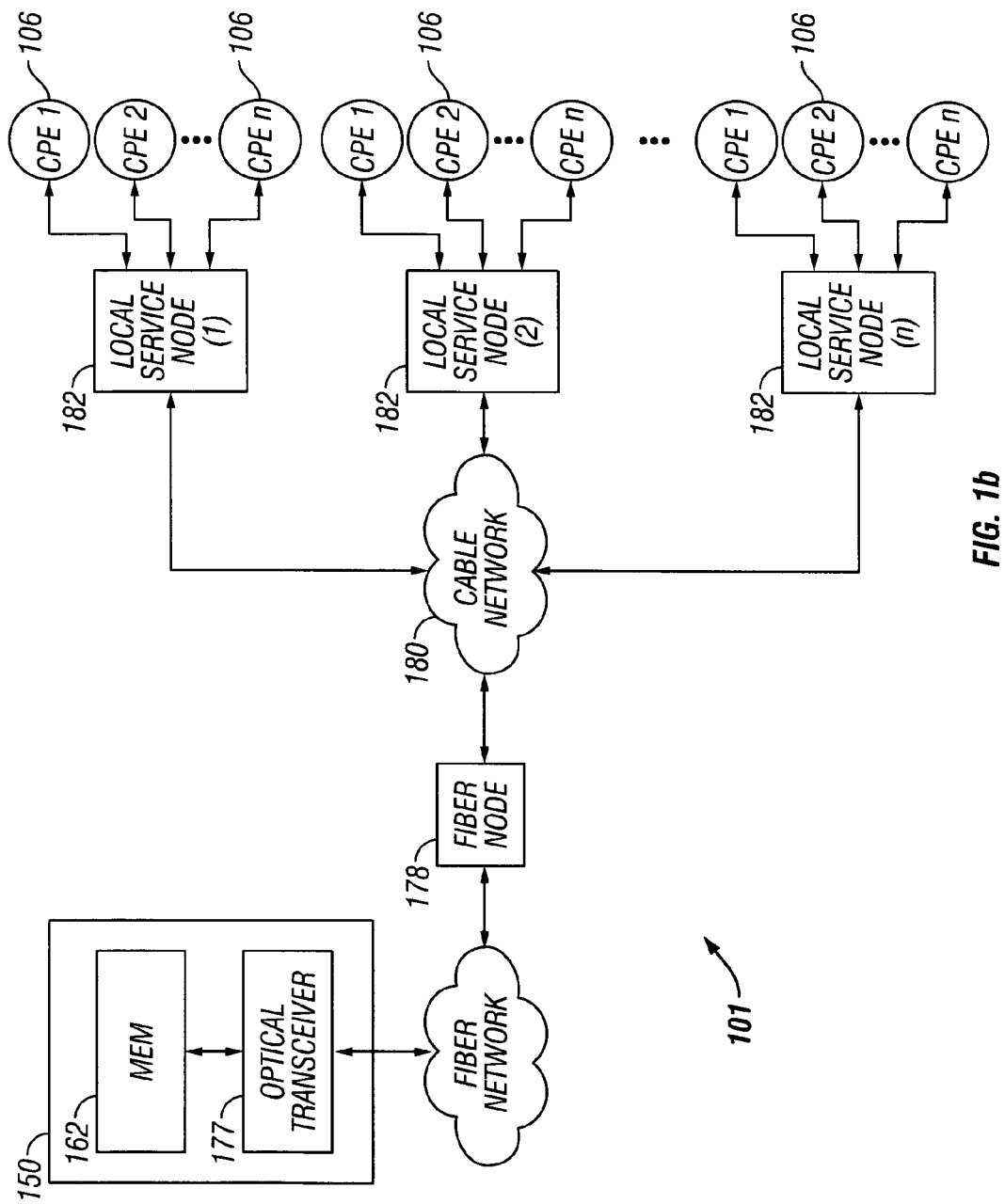
FIG. 1b is a functional block diagram illustrating one exemplary local service node configuration useful with the present invention.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks—

Figure 1C:
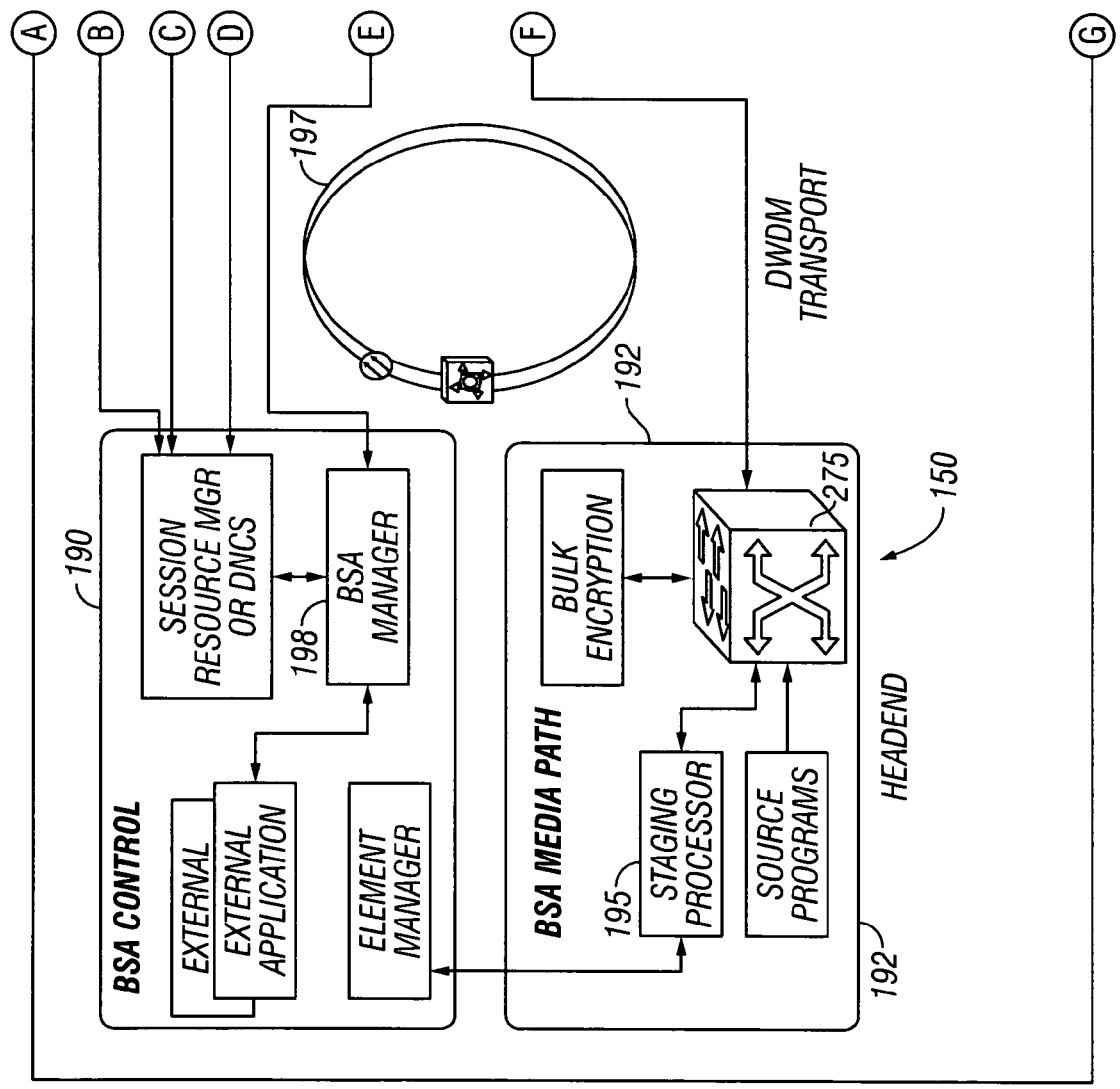
FIG. 1c illustrates an exemplary "switched" network architecture useful with the present invention.
Figure 1C:
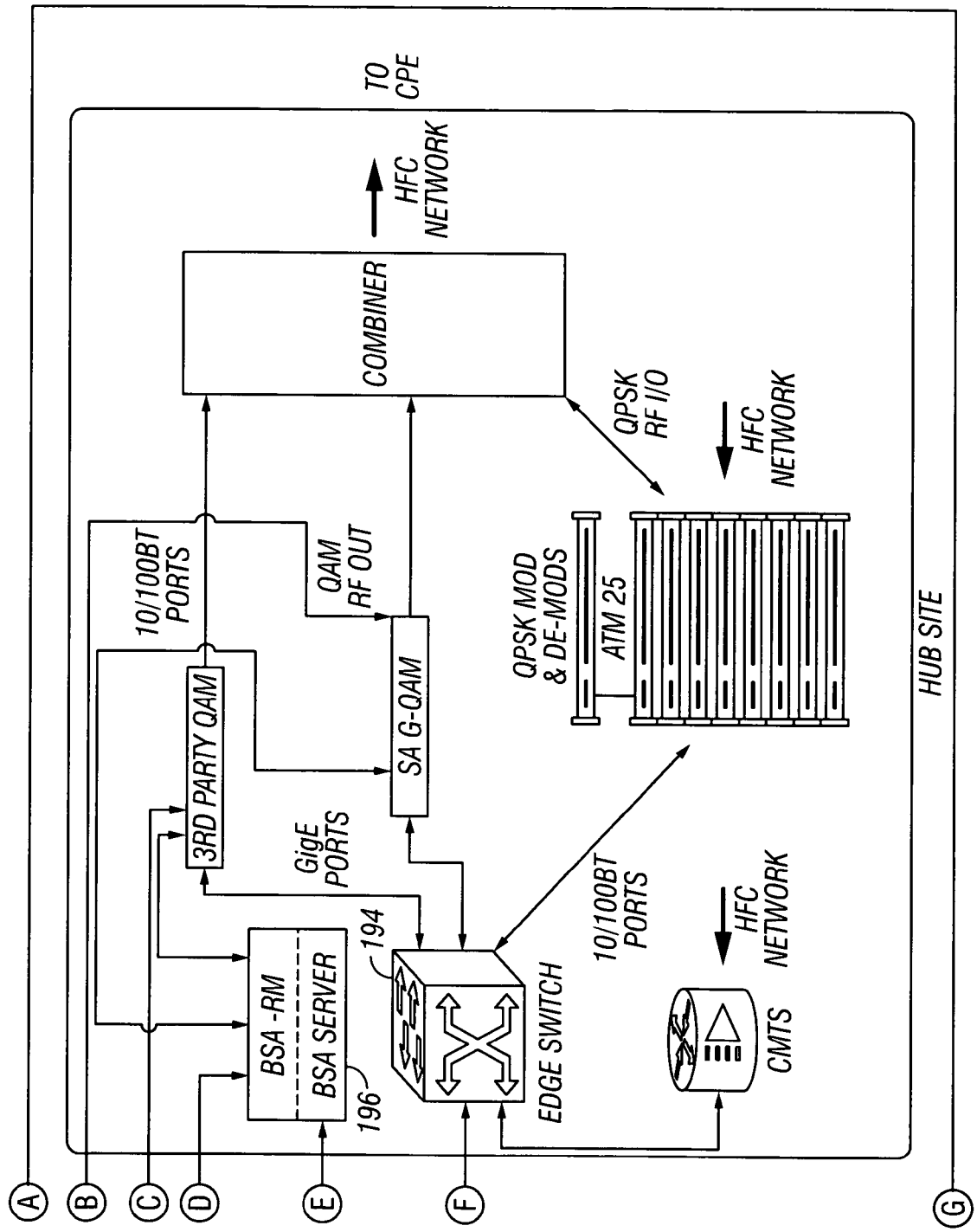

FIG. 1c illustrates an exemplary "switched" network architecture useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched digital network architecture. Specifically, the head-end 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and in one embodiment implements functions related to anticipatory switching, bandwidth conservation, and utilization of the vacated bandwidth (in conjunction with a management entity 198 disposed at the head-end) as discussed subsequently herein. An optical transport ring 197 is utilized to distribute the dense wave-division multiplexed (DWDM) optical signals to each hub in an efficient fashion.

The staging processor 195 located at the head-end 150 accepts each incoming program stream (e.g., single program transport streams, or SPTSs) and clamps it to a pre-established guaranteed maximum bit rate, and adds null packets to produce a constant rate output. It is noted that the term "constant rate" as used herein is to be differentiated from so-called "fixed rate" approaches, such as those of encoders. This latter approach basically fixes the output rate from the encoder to a known value, and merely adjusts the encoding rate as a function of input to produce the desired fixed output. No null or overhead packets are inserted, however.

The resulting clamped streams are then encapsulated into UDP datagrams for multicast delivery. In one embodiment, two or more constant rate streams are combined using the foregoing encapsulation protocol such IP/UDP before transport to the hub site(s), thereby in effect forming a multiplex of sorts. The combined or composite "stream" received at the hub site(s) is then fragmented back into its original program streams.

Co-owned and co-pending U.S. patent application Ser. No. 09/956,688 filed Sep. 20, 2001 and entitled "Technique For Effectively Providing Program Material In A Cable Television System", incorporated herein by reference in its entirety, describes one exemplary switched architecture useful with the present invention, although it will be recognized by those of ordinary skill that other approaches and architectures may be substituted.

BSA programming may comprise, without limitation, simulcasts, interactive pay-per-view (IPPV), live sporting and other events, and other selected offerings. A set-top box (STB) or two-way Digital Cable Ready (e.g., CableCard) television is typically required for viewing.

In order for the BSA function to be transparent to the subscriber, channel change latencies must be kept to a minimum (e.g., degradation of 250 ms or less as compared to average linear digital broadcast services). Like video-on-demand (VOD) systems, BSA programs are streamed to a service group (contrast: switch) only when being viewed. Unlike VOD, many viewers can view the same stream. Typically, only real-time linear programs are included in BSA broadcasts. Since there is no storage involved, the "VCR" controls (e.g., trick mode functions) common to VOD are not available. In this regard, BSA is much simpler that VOD. Commercials or other programming segments cannot be skipped, and program bit rates are treated as in more conventional systems.

In the context of the aforementioned BSA network, there are several metrics or indices which are useful in evaluating the performance of the network. Specifically, the expression "peak streams" represents the maximum number of different program streams that are instantaneously (based on specified data intervals) needed as a worst case. Using software, CPE tuner addresses can be purposely or randomly assigned to service groups, and peak stream requirements can be analyzed for each group size. It has been noted by the Assignee hereof that generally speaking, as service group size is decreased, peak stream needs also decrease. When viewed over a sufficiently short time scale (e.g., two hour periods), it is possible to compare the moment-to-moment variability in peak stream use.

It has also been noted that the smaller service groups display roughly the same variability as the larger service groups. When considered as a percentage of maximum stream use, as service group size decreases, variability increases, and will impose a limit the amount of concentration that can be safely implemented within the system. Concentration in the context of BSA networks is defined as a ratio of the total bandwidth of the programs offered, to the BSA bandwidth provided to the service group. While this is conveniently expressed as a ratio of stream counts, in practice streams will be of various bit rates; concentration is therefore best thought of as the ratio of the bit rates. Concentration generally (at a given grade of service or blocking frequency) trends upwards with decreasing service group size.

Another useful metric of the value of BSA is yield. Yield is a function of concentration and the total number of programs included. Yield is important to consider when comparing the value of various bandwidth reclamation techniques.

As verified by actual trials conducted by the Assignee hereof, BSA provides significant concentration, which results in the ability to vacate significant portions of the previously occupied bandwidth ("free" bandwidth yield).

Also of interest is the metric of "redundant viewership". Redundant viewers are those which view otherwise unique programs. Generally speaking, the highest number of redundant viewers occurs at prime-time or just post prime time. This is also the time of greatest total viewership and the time of highest peak stream needs. A design point of X streams would provide a non-blocking grade of service; however, however, significant surplus bandwidth still exists below the X-stream level. Unfortunately, the greatest surpluses often occur at times when other services (e.g., VOD) also have their lowest demands. Edge QAM resource sharing with VOD is therefore not expected to provide significant interleaving bandwidth gains. However, the BSA system can be advantageously operated to allow this surplus bandwidth to be utilized in other ways, such as for transport of data, video, voice, or even future applications which would require additional bandwidth.

Gain is a useful parameter for comparison of BSA with statistical multiplexing technology. In BSA, percent gain is defined as:

$$(\text{Concentration}-1) \times 100 \qquad \text{Eqn. (1)}$$

In this context, content that occupies the "freed up" spectrum is assumed to operate with the same level of efficiency as the content being processed (i.e. switched under the BSA architecture, or alternatively statistically multiplexed).

A primary advantage of the BSA paradigm is bandwidth conservation/preservation. Bandwidth for unviewed programs is not consumed, and can be re-allocated. Similarly, new programs can be added without adding bandwidth. Advantageously, programs with narrow appeal can be added in a BSA system with little if any bandwidth impact. More popular programs will impact the BSA bandwidth, but to a lesser extent than was traditionally the case. Multiple bit rates can also be made available for use or sale to programmers or advertisers.

BSA bandwidth efficiencies are at least in part a result of over-subscription. Specifically, the selection of programming is greater than the bandwidth allocated to the service group. This can result in blocking, the case where a viewer is denied access to a requested program. However, the aforementioned trials conducted by the Assignee hereof demonstrate that when properly configured, blocking events are sufficiently rare, so as to be less common than a network outage, thereby providing a sufficient level of service.

Additionally, a BSA system typically gathers and keep logs or other records of programmer-specific viewership data from the server side. These logs or records are maintained to allow for well-considered "recapture" of non-viewed program streams (i.e., reclamation of bandwidth). The server manages bandwidth by removing streams based on this activity data. In typical practice, unviewed streams will be marked, but not actually removed until the bandwidth is needed either because of a client request, or based on external resource demands such as VOD overflow.

In one exemplary embodiment, the network switch 194 (FIG. 1*c*) logs all channel change events and is aware of the tuning locations of all tuners, not just those that happen to be viewing BSA programs. This provides highly accurate and complete viewership data based on actual channel changes as contrasted with extrapolations or other estimation techniques.

In the exemplary embodiment of the present invention, the edge switch 194 (generally located in the distribution hub as shown in FIG. 1*c*) is flooded with all available programs. This improves transport efficiency, because a simple unidirectional "drop and continue" protocol is performed at each hub location on a given optical transport ring 197. The concept of flooding also simplifies the transport network in that no control system is needed; rather a simple "deliver everything" paradigm is used. This approach also advantageously makes this portion of the signal chain more robust, since more complex control systems generally lend themselves to a higher operational failure rate.

Because ordinary broadcast programming is supplied using BSA, the transport network 197 needs to have a high degree of availability. In the exemplary embodiment, BSA program transport is supplied through a redundant, spatially diverse counter-rotating Ethernet ring topology, although other topologies may be utilized with success.

Methods—

Figure 2:
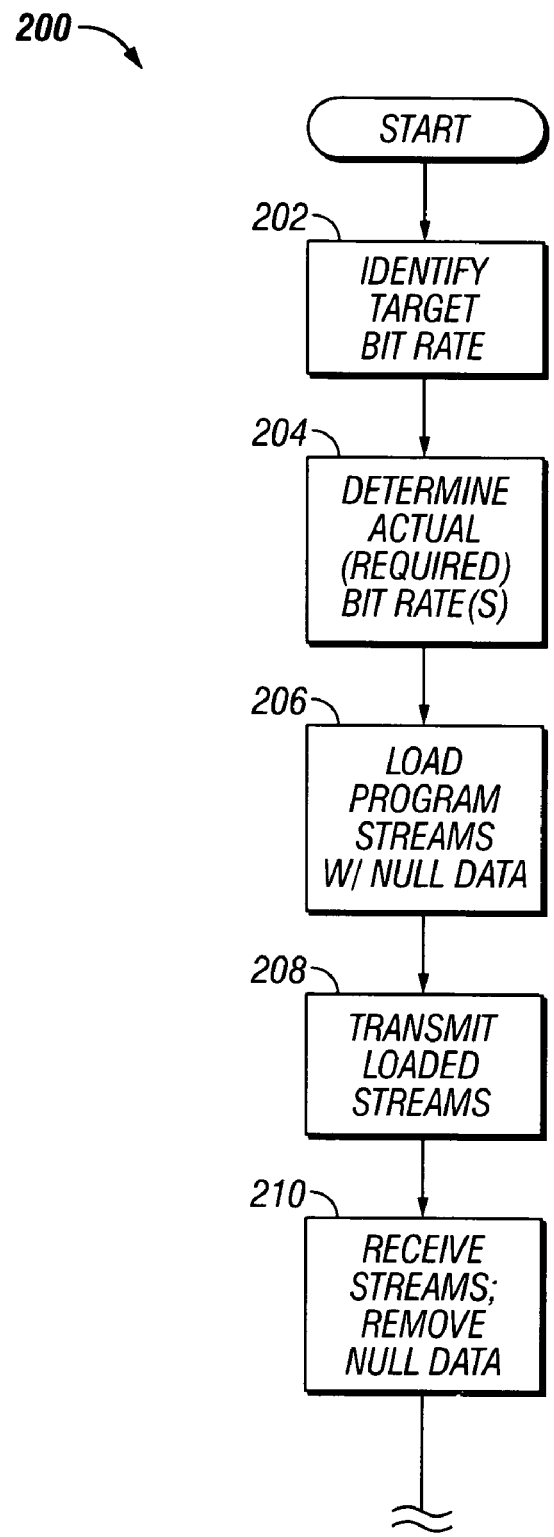
FIG. 2 is a logical flow diagram illustrating one embodiment of the method of operating a content-based network using variable bit rate compensation according to the present invention.
Figure 2A:
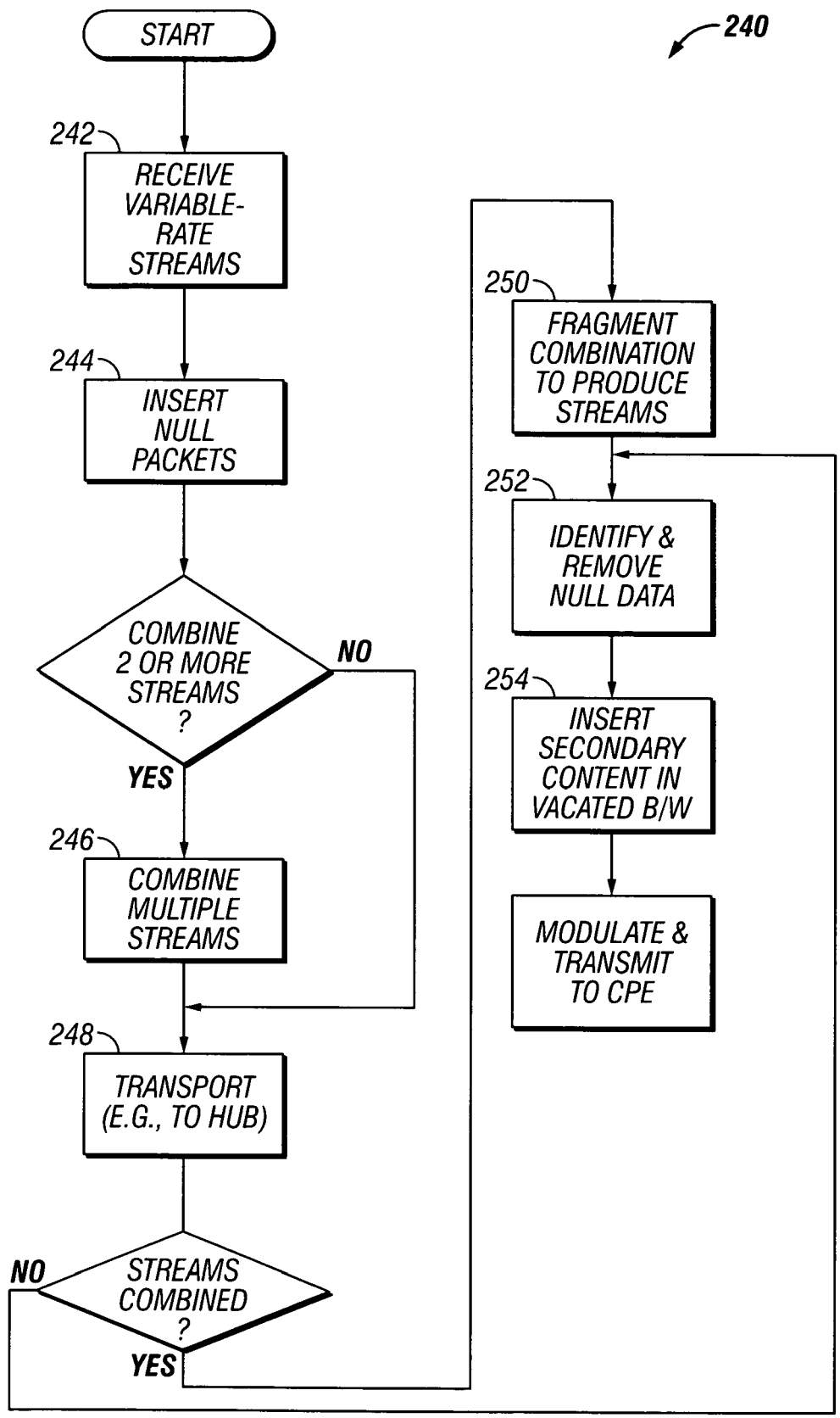
FIG. 2a is a logical flow diagram illustrating one exemplary embodiment of the method of FIG. 2.
Figure 2B:
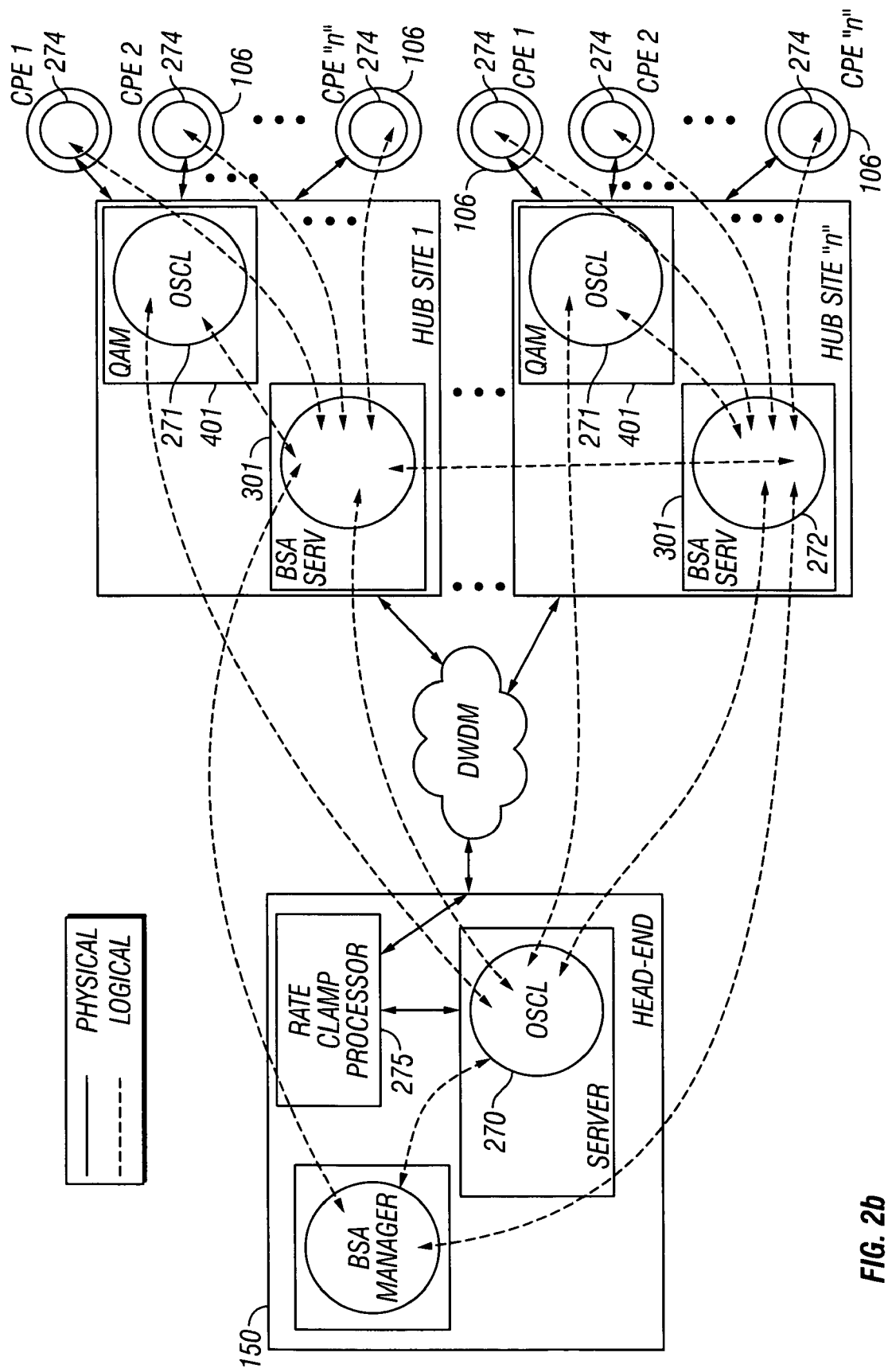
FIG. 2b is a graphical representation of an exemplary hardware/software architecture implementing the functionality of the invention.
Figure 2C:
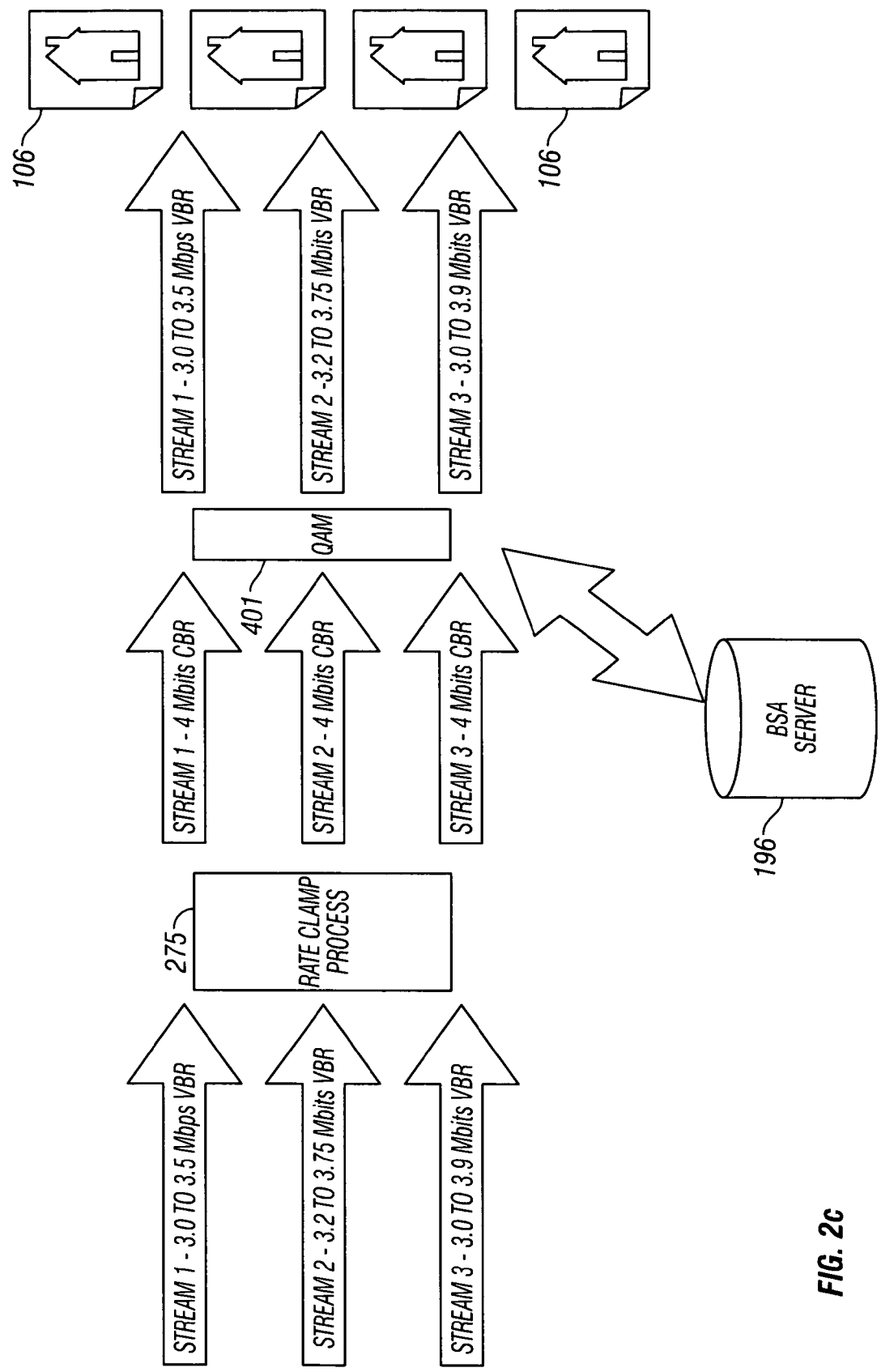
FIG. 2c is a graphical representation of the methodology of FIG. 2 in the context of a broadcast switched architecture (BSA) network.

Referring now to FIGS. 2-2*c*, exemplary embodiments of the method of operating a content-based network using opportunistic secondary content loading (OSCL) according to the present invention are now described. It will be appreciated that while these embodiments are described in the context of an exemplary BSA network, the invention is not limited to such applications, and in fact can be adapted to other types of network paradigms.

Furthermore, as described in greater detail below, the invention is in no way limited to applications requiring the insertion (and removal) of null data; rather, alternate embodiments employ no such null data inclusion/removal, but rather operate entirely on opportunistic knowledge of the properties of the variable rate streams themselves.

As previously noted, digital program streams in a BSA network are acquired in the head end 150 of the network and include various components, including: (i) a video portion, (ii) an audio portion, and (iii) a data portion. Each one of these components consumes a certain bandwidth that changes over time in a generally non-predicable manner.

In the BSA environment, each acquired program stream may have a constant or assigned bandwidth. This requirement stems from the desire to maintain a substantially known or constant bit rate for, inter alia, the insertion and removal of streams by, e.g., servers in broadcast switched digital architectures. For example, in a typical BSA network, the total bandwidth allocated to a program stream (all components) is 3.75 Mbps.

FIG. 2 illustrates a generalized methodology 200 of program stream "stuffing". Specifically, the method comprises first identifying a "target" bit rate level (step 202). The actual bit rate level required by each program or content stream is determined per step 204. The program stream(s) are then each loaded or "stuffed" up to the aforementioned target bit rate level at the rate clamping processor 275 (FIGS. 2*b* and 2*c*) before transmission to the QAM 401 at the hub site (FIG. 1*c*) per step 206. Per step 208, the stuffed program streams transmitted in combined (e.g., encapsulated) fashion over the relevant portions of the network between the head-end and QAM. Once received at the QAM (e.g., the hub site), the combined transport is processed to identify the constituent streams, and the streams are analyzed to identify and remove any "stuffing" packets before any subsequent processing and delivery of the program stream to the network subscribers (step 210).

However, as noted above, this "clamping" of the bit rate for each program stream can also produce reduced bandwidth efficiency. By clamping the rate at a fixed value, excess bandwidth will sometimes be allocated to streams which do not require the full amount of bandwidth. In the context of the foregoing example, such a program stream might only require 3.25 Mbps peak, but is none-the-less allocated 3.75 Mbps. Hence, the additional 0.5 Mbps of allocated bandwidth is in effect wasted.

The approach of the present invention advantageously overcomes this disability by making opportunistic use of the excess bandwidth for delivery of secondary content. In accordance with one exemplary embodiment of the invention, the BSA server process 272 work with the QAM process(es) 271 to utilize the bandwidth made available by removal of the null (overhead) data by the QAM process 271. In particular, the BSA server process 272 directly or indirectly provides the QAM process 271 with secondary data that is inserted into or along with the programming streams after removal of the stuff data, and before transmission to the CPE 106.

In one embodiment of the invention, the secondary data is comprised of non-time sensitive information including, but not limited to, files or other data structures relating to pictures (e.g., JPEGs), video or audio programming (MPEGs, .WAV, .DAT, MP3, etc.) advertisements, promotions, software applications (e.g., navigation applications, games, etc.), software updates, data files, stock prices, program listings/EPG data, and program descriptions, all that can be executed, initiated or played as applicable at a later time or upon completion of the download via the relevant QAM(s). The use of non-time sensitive information (i.e., does not have an intrinsic temporal relationship between delivery of its components, or need to maintain any relative or absolute timing) in this embodiment is driven primarily by the availability of the bandwidth created by the removal of the null data being highly variable, due to the variability of the actual bit rate with respect to the prescribed target bit rate for each of the program streams.

FIG. 2a is a flow chart illustrating one exemplary embodiment of the opportunistic bandwidth utilization method 240 performed in accordance with the invention. The process comprises first receiving a variable rate program data stream from one or more sources (step 242).

Per step 244, null or stuff packets are inserted into the variable rate data stream to generate a substantially constant rate stream. As previously described, this substantially constant rate (e.g., 3.75 Mbps for an SD stream) is determined in order to permit the insertion and removal of streams by, e.g., servers in the exemplary broadcast switched digital architecture, although the rate may be set based on other reasons as well.

The resulting constant rate stream is then optionally combined with other such "stuffed" streams (step 246), and the resulting encapsulated/combined transport transmitted via a suitable network transport mechanism (step 248). This transport mechanism may comprise, for example, a DWDM network of the type well known in the art, although other mechanisms may be used with equal success.

Per step 250, the transmitted and received transport is fragmented or de-combined, and the null or stuff packets are removed from one or more of the component program streams (step 252), thereby re-generating one or more of the prior variable rate streams.

Per step 254, the secondary (e.g., non-time sensitive) data is next (i) inserted into one or more of the regenerated variable rate streams to generate one or more new streams that include both the primary (e.g., time-sensitive content) data, and the secondary (non-time sensitive) data; and/or (ii) used to form one or more new "secondary content" streams, these secondary content streams in effect occupying the bandwidth vacated by removal of the null packets from other streams. As described in greater detail subsequently herein, the secondary data can be inserted based on a variety of different bases. For example, one embodiment of the invent uses communications received from the head-end or upstream null packet insertion process indicating the rate at which null packets were inserted (and hence removed) as a guide for secondary insertion, as described subsequently herein.

Alternatively, the secondary insertion process can be made autonomous of the head-end or upstream process, such as where the null packets inserted (and removed) are simply counted, and a like amount of secondary data (accounting for any additional required overhead) is inserted. This approach presumes, however, that the null packet removal process can identify the bits for removal, such as via a null bit packet ID, known temporal or sequential relationship (e.g., null packets are always present in a certain slot or order), or similar means.

The recovered variable rate streams may also be "stuffed" up to a desired overall stream data rate or a prescribed margin by using (i) the secondary data alone; (ii) additional null data inserted at the insertion point for the secondary data alone; or (iii) both. Such stuffing of secondary data/secondary null data to a known or constant rate/margin may be useful to provide, e.g., a threshold level or margin beyond which is reserved for other overhead packets, etc. (using a constant overall rate), and/or known or predictable data rate qualities which may be more easily handled by the algorithms of the corresponding client process of the CPE 106 (constant margin approach). For example, one or more CPE processes may desire or require a more even secondary content download rate as opposed to one where the rate of secondary content download and extraction varies widely as a function of primary content program stream variation; in such cases, a constant margin (i.e., secondary content is always inserted at X Mbps over the actual variable rate, so long as total rate does not exceed channel capacity).

However, it will be appreciated that each recovered variable stream may simply be stuffed with secondary data effectively right up to its bandwidth limit (accounting for necessary overhead) if desired as well, thereby maximizing the efficiency of the channel as a whole through near-complete use of all vacated bandwidth.

It will also be appreciated that the secondary content data need not be inserted into the same program stream as that from which the corresponding null data has been removed. While one embodiment of the invention utilizes such "one for one" correspondence (i.e., remove X bits/sec of null data from stream A, and replace approximately X bits/sec of secondary content back into stream A), the invention can readily be implemented by placing the secondary content in any available program stream (i.e., remove X bits/sec of null data from stream A, and replace approximately X bits/sec of secondary content back into one or more of streams B, C, or D). Furthermore, the invention may be implemented by spawning entirely new streams based on the secondary content (e.g., at the hub site), and the recovered variable rate streams and the new streams transmitted to the subscriber(s) using the same or different QAM channels. The foregoing modes can also be intelligently switched between (e.g., by the BSA server/QAM modulator in the exemplary BSA embodiment). Hence, the present invention provides great flexibility in implementation.

The new data stream(s) is/are then transmitted to the end user system at step 256. The transmission to the end user may be according to any transport mechanism, such as via a packet-switched communications protocol (e.g., Internet Protocol or the like). Upon receipt, the CPE 106 and its resident client process analyzes the incoming stream(s) to identify and extract the secondary data (step 258). If the streams sent to the CPE 106 are multiplexed before delivery over the QAM channels, then the CPE may de-multiplex the streams before such analysis is performed.

With foreknowledge of variable stream rates, and the occurrence of a significant "window" of contiguous transient bandwidth, delivery of limited amounts of time-sensitive secondary content is also possible under the invention. It will be appreciated that the degree of latency between the recognition or identification of vacated bandwidth and its insertion can be important factor in making maximal use of the vacated bandwidth. Stated differently, the information about what point or time reference in the program stream that the vacated bandwidth exists must be timely, so that the secondary content can be inserted before that vacated bandwidth disappears (e.g., due to an sudden increase in variable program stream rate). The more anticipatory this process is, the more accurately the BSA server and QAM processes can map the insertion of secondary content to the vacated bandwidth in the stream. One approach is to buffer the stream data so that sufficient time for analysis, identification, overhead removal, and secondary content insertion can occur.

Another approach is to provide anticipatory or look-ahead functionality via communications from the null data insertion process (e.g., null data insertion rates as a function of time or location in the program stream). If this look-ahead window is far enough in advance of the time of insertion of the secondary content, more extensive "fitting" of the secondary content to vacancies in the program stream can be performed. For example, if the secondary content insertion process knows that a window of X seconds will exist in the future wherein at least some minimum level of null packets will be continuously and contiguously inserted into the stream, then this window can be used to insert secondary data of a time-sensitive nature, since the minimum vacated bandwidth and continuity will allow for uninterrupted delivery for at least the duration of the window. Hence, in another variant of the invention, the BSA server/QAM processes are configured to selectively provide different types of secondary data (e.g., non-time sensitive and time-sensitive) based on predictions or look-ahead functionality of the stream(s) to be delivered to the BSA hub site.

In another variant, the methods and apparatus set forth in co-pending and co-owned U.S. patent application Ser. No. 11/243,720 filed Oct. 4, 2005 and entitled "SELF-MONITORING AND OPTIMIZING NETWORK APPARATUS AND METHODS", which is incorporated herein by reference in its entirety, are used to gather and analyze the historical network (and CPE) operating data, although other approaches for gathering and evaluating data may be used. Specifically, the CPE 106 of the network gather operational data and transmit this information to a BSA server process 272 (FIG. 2b) which collects the data for all relevant CPE into a historical database. This database is periodically analyzed, and used as the basis for anticipatory control of the network and bandwidth allocation therein.

Furthermore, using the boundary enforcement and targeting methods set forth in co-owned and co-pending U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety, the populations of service groups of the BSA network can be determined on a per-CPE basis (using, e.g., the TUNER ID, TUNER USE, MAC address, or other such identifying information of the subscriber's CPE 106), such that certain CPE 106 can be targeted (in an anonymous fashion if desired) for delivery of the secondary content. For example, in one embodiment, the TUNER ID or other variable is used as the basis of anonymous identification and stream delivery to the relevant CPE 106, such stream(s) containing both primary content and secondary content.

In terms of the mechanics of the null data insertion, one exemplary embodiment of the invention utilizes an algorithm that inserts the null data in a sequence within a data packet structure of the program stream, although it will be recognized that other approaches may be used. This packet structure includes a packet header and variable bit payload. The header identifies the "null" packet(s) within the stream for easy removal by the QAM before distribution, as discussed in greater detail subsequently herein. Ideally, the packet structure utilized for stuffing the null packets into the program stream comprises a packet protocol already utilized by the system for delivery of the program stream so as to allow for implementation of the invention with as few changes to the existing infrastructure as possible, yet this is not a requirement for practicing the invention.

Insertion of the null data occurs at the "smart" rate clamping processor 275 (FIG. 2c), although it will be appreciated that other configurations may be used.

As used in the context of stream rates, the term "constant" will be recognized to refer to values of a target bandwidth ($B_t$) that may or may not remain constant as a function of time and/or other network parameters, but may be constant across each of the program streams within a pool. Specifically, the algorithms of the present invention will seek to, within a given window or period of time, "stuff" the program stream(s) of interest with the appropriate null packet loading in order to achieve and maintain a target rate. FIG. 2c illustrates this property graphically; three input streams each having a different variable bit rate are "stuffed" to reach a common/constant 4.0 Mbps rate for delivery to the QAM at the hub site.

The insertion of the null data within the program streams ($P_1, P_2, \ldots P_n$), or alternatively into their own streams, achieves several objectives, including inter alia allowing for a "constant" (stuffed) effective bandwidth for each program stream.

As previously noted, the null packet headers of the exemplary embodiment are used as the basis of null data identification and removal, although it will be recognized that other approaches may be used. For example, in one alternate embodiment, the transmitting entity (e.g., rate clamping process 275 of FIG. 2c) can send in-band or OOB downstream messaging to the QAM in order to identify (i) the number of null packets inserted/rate of insertion per stream (i.e., how much the QAM should expect to have to remove from each program stream), and (ii) other identifying information, such as SI or other timing coordinates within the program stream that identify the location of the null packets, and correlate the rate to a given point in the stream. However, this approach consumes additional downstream bandwidth and requires additional facilities on both ends (head-end/multiplexer and QAM(s)) to generate, transmit, receive, and analyze the messages.

Figure 2D:
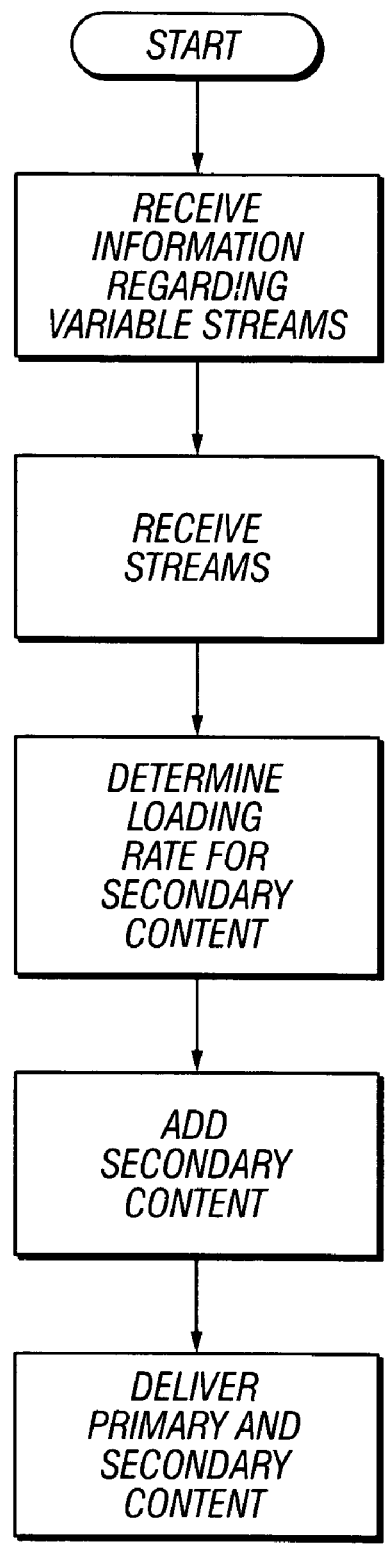
FIG. 2d is a logical flow diagram illustrating another exemplary embodiment of the method of opportunistic loading according to the invention, wherein no null data is utilized.

In yet another embodiment (FIG. 2d), the downstream messaging (whether in-band, OOB or otherwise) can be used to obviate the use of null data altogether. Specifically, in the exemplary broadcast switched architecture previously described herein, the BSA server 196 (and system as a whole) does not require any null data per se; rather, it only requires to some knowledge regarding the rates of the variable-rate streams at a given point in time. Hence, if this information is communicated to the hub site (e.g., the variable rate, or alternatively the rate at which the null data would have been otherwise inserted), the server and/or QAM (either alone or in combination, depending on configuration) can use this information to load secondary content into the variable streams and/or create additional streams, up to a "clamped" maximum rate that is prescribed for the network. This clamped rate acts as a "do not exceed" rate; the QAM/BSA server can load secondary content up to this limit (accounting for overhead, etc.), and tailor the secondary content loading rate based on the information received from upstream. Since some "foreknowledge" of the variable rate at a given point of time is necessary (i.e., the QAM/BSA server needs to know slightly in advance of the arrival of the program streams what their associated variable rate is so that secondary content insertion can be tailored to the available bandwidth), the exemplary embodiment of the invention uses a buffering scheme (e.g., FIFOs) to provide this delay, with the depth of the buffer(s) set to provide at least the minimum required delay to allow for the insertion of the secondary content for delivery downstream.

Note that if there is not a precise matching (with certain prescribed error or tolerance band) between the secondary content insertion rate and the "vacated" or available bandwidth, there is the risk that instances where the secondary rate is too large for the available bandwidth, thereby exceeding the "clamped" or maximum rate, which can have deleterious effects on signal quality, network operation, etc. This is not just true where the secondary content is inserted "late", but also where inserted too early as well. Hence, one variant of the invention uses SI time references for the downstream messaging relating to the variable rates, thereby allowing the insertion process at the QAM/BSA server to make adjustment for any variable or unanticipated delays by matching the SI reference in the rate message to the correct portion of the stream(s) into which (or along with which) the secondary content will be placed. Alternatively, a global time reference can also be used for this purpose.

Figure 2E:
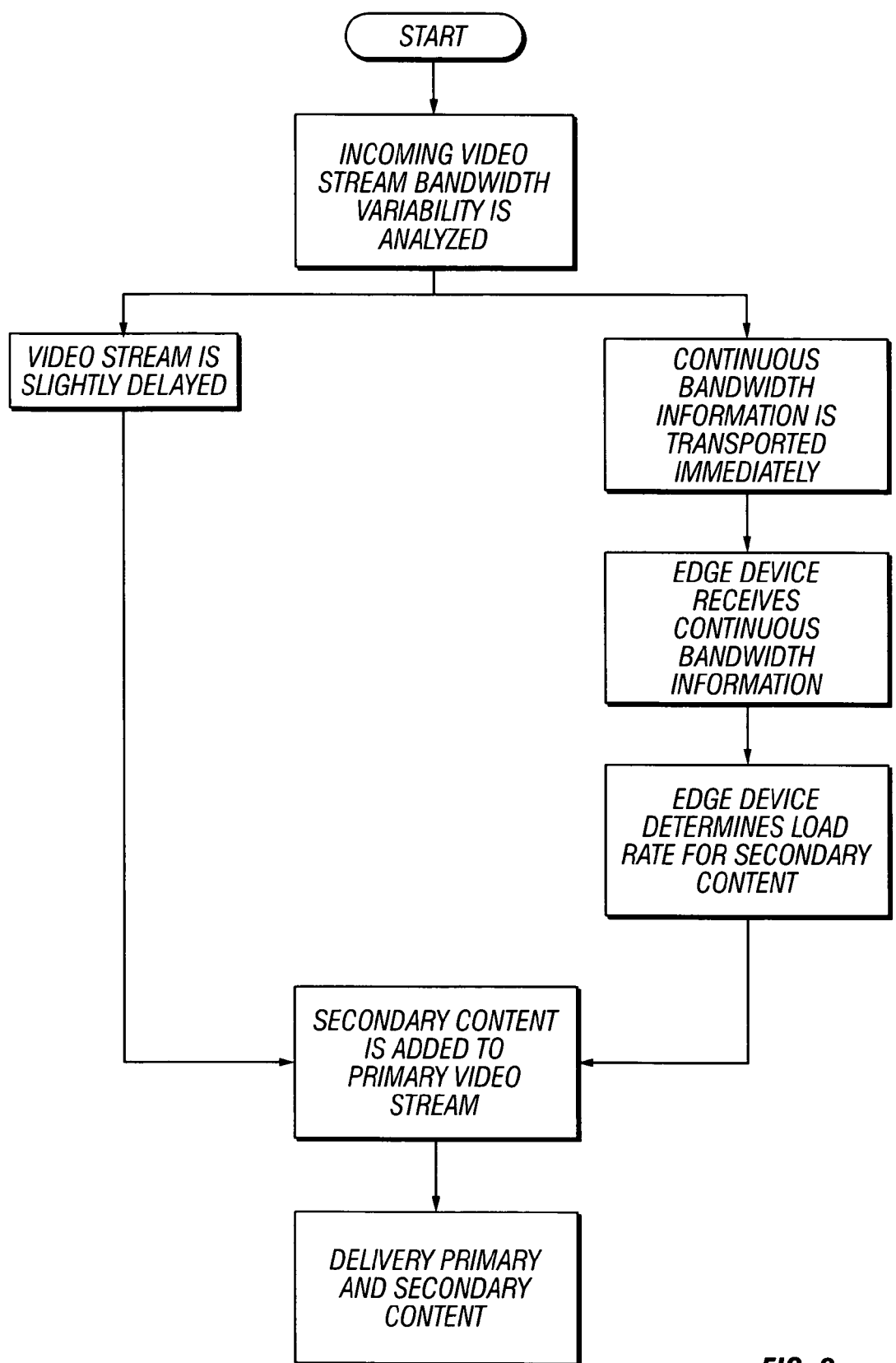
FIG. 2e is a logical flow diagram illustrating yet another exemplary embodiment of the method of opportunistic loading according to the invention.

FIG. 2e illustrates yet another embodiment of the method of opportunistic loading according to the present invention.

In terms of the constitution of the null data (e.g., packets) itself, where used, the exemplary embodiment utilizes a packet header for identification of the null data as previously described, although other approaches (such as use of a series of "0" or "1" bits in order to aid in easier identification) may be utilized. It will also be recognized that while the exemplary embodiment of the invention uses null data that carry no inherent information (i.e., merely to take up space within the program stream in order to pad it out to the desired target bandwidth), these null data (packets) may also carry information if desired. For example, assuming a sufficient number of packets are stuffed, the null packets (or bits within the packets) can be used as CRC or FEC for other data within the program stream, or as a downstream communication channel of sorts. Since it is rare that the target bandwidth $B_t$ would be completely used up (i.e., $B_m=0$), there will almost always be some number of null packets within each stream to utilize for these purposes.

FIG. 2b illustrates one exemplary embodiment of the hardware and software architecture of the opportunistic secondary content loading (OSCL) functions of the present invention, in the context of a BSA network.

In one variant, the head-end process 270 communicates with a QAM process 271 as previously described in order to (i) load or stuff each program stream up to a target bit rate, (ii) unload each stream of the null packets, and (iii) insert secondary data into the bandwidth vacated by the removed null data before transmission over the HFC network to the subscribers. The head-end process 270 communicates stuffing rates downstream to the QAM process 271 sufficiently in advance to allow for a high degree of correlation between removed null data and inserted secondary data, given system transmission, communication, processing, and other delays. In one embodiment, the downstream communications or reports are provided periodically; e.g., once every X msec. or the like. Alternatively, reports can be generated only when stuffing or packing is occurring (or at a predetermined level).

The insertion/addition of secondary data can also be performed on or with "non-stuffed" streams, as previously described herein.

In another variant, the insertion process at the hub site is substantially stand-alone and autonomous of the head-end, being able to (i) identify null packets without any communications from the head-end or other entities, such as via packet headers, or a socket/port or other address; (ii) remove the null packets, and (iii) insert an appropriate amount of secondary content, before modulation and transmission to the CPE 106.

The insertion process at the hub site may also be autonomous of the head-end, yet coordinate with the BSA "intelligence" and processes running on the BSA server 196 in order to effect delivery of the secondary content to the desired set or subset of service group users. This approach allows a finer degree of resolution or granularity in terms of selecting individual CPE/subscribers to receive the secondary content. For example, one embodiment relies on the QAM process 271 to monitor the program streams for stuff data as described above, and reports the quantity of bandwidth occupied by the stuff data (and removed) to the BSA server process 272. The BSA server process 272 uses this information to determine the rate of secondary data to provide for insertion after the stuff data has been removed; e.g., the BSA server 272 will forward secondary data to the QAM process 271 at a rate equal to or less than the bandwidth occupied by the stuff data, and therefore vacated.

Alternatively, the BSA server 272 can simply provide secondary data to the QAM process 271 via a buffer or similar mechanism. It can supply the buffer directly, or it can provide a link to the source of the secondary data (such as, e.g., an internal network address or an IP address). The QAM process 271 will then just "pull" or drain data from the secondary data buffer as capacity becomes available due to the removal of the stuff data. The BSA server 272 (or other entity) can then monitor the size, or backlog, of the buffer, and control the data rate supplied to the buffer as a function thereof; e.g., via "high water" and "low water" marks, or other such buffer management techniques well known to those of ordinary skill.

In still another embodiment of the invention, the BSA server process 272 is tasked with monitoring the program streams directly for stuffed overhead. The BSA server 272 then instructs the QAM process 271 to insert secondary data according to a designated rate, formula, etc., e.g., utilizing the aforementioned buffer fill approach.

Irrespective of the method chosen, the BSA switch is operated so as to deliver the appropriate program stream(s) to the desired service group members. Since the topology of the network between the CPE and the hub (and switch) is fixed, there is a known relationship which can be exploited. As an example, a given CPE can request download of a data structure (e.g., file), such as a MP3 audio file. The TUNER ID or similar variable associated with that CPE is transmitted upstream, and correlated with current viewer tuner activity. In one variant, the BSA server examines its logs or current configuration to determine which program streams are presently being (i) switched for delivery to the portion of the topology containing the requesting CPE, and (ii) tuned to by the requesting CPE (such as via tuner logs or reports communicated from the CPE upstream). This way, no further tuning by the CPE is required; the program stream to which the CPE is tuned is then selected to act as the designated secondary content carrier.

However, this approach of determining what program stream the CPE is tuned to can be obviated in favor of a "forced tune" approach, wherein one of the tuners of the CPE can be directed to tune to a designated downstream channel (frequency) to receive the secondary content.

In yet another embodiment of the invention, the insertion of secondary content can be made "program-stream agile", such that the stream(s) into which the secondary content is being inserted is dynamically varied as a function of one or more parameters. For example, the aforementioned method of determining which stream the requesting CPE is tuned to can be used to track channel changes by the subscriber, and continue delivery of the secondary content, such as where the subscriber tunes away for the existing program stream carrying the secondary content. Rather than forcibly tune the subscriber's CPE back to that channel to complete the download, the QAM (and BSA server process) can simply shift secondary content insertion to the newly selected program stream. This can be coupled with a short "retransmit" or reinsertion of the last few frames or bytes of data, so as to allow for discontinuities that may occur during the switching transient and re-alignment of the insertion process to the new stream.

The head-end, BSA server and QAM processes 270, 272, 271 may comprise independent stand-alone applications, or alternatively parts of a distributed application (DA) of the type well known in the programming arts. One or more application programming interfaces (APIs) are also provided within each process to allow for, inter alia, communication with the other entity, communication with other remote processes, communication with the network operators (such as via a GUI), and so forth. The structure and implementation of distributed applications and APIs are well known in the programming arts, and accordingly not described further herein.

It will also be recognized that the present invention may be used in conjunction with data of varying QoS levels, including "lossy" types of data. For example, the secondary data inserted at the distribution node (e.g., QAM of a hub site) can have varying levels of QoS, such as VoIP data, which can suffer some degree of packet loss without significantly degrading the ultimate uses of this data at the CPE or other destination. Hence, if the secondary content insertion rate is kept low enough, there will almost always be some null or overhead data removed from one or more of the program stream(s), thereby vacating a comparable amount of bandwidth to support the lossy communications/data transfer. An operational rule or "interlock" might specify, for example, that during a VoIP call, the null data insertion rate for a given stream will be maintained at a given minimum value or above (thereby guaranteeing sufficient vacated bandwidth), and the tuner cannot switch program streams (although the placement of this stream in the delivered QAMs may vary) until the call is complete.

In yet another aspect of the invention, a wideband tuner approach such as that described in co-owned and co-pending U.S. patent application Ser. No. 11/013,671 filed Dec. 15, 2004 and entitled "METHOD AND APPARATUS FOR WIDEBAND DISTRIBUTION OF CONTENT", incorporated herein by reference in its entirety, can be used for delivery of individual program streams (or a multiplex of streams). Specifically, the individual streams (including any secondary data entrained therein), and/or discrete secondary data streams, can be multiplexed across a plurality of carrier frequencies or bands at the QAM, and then transmitted. The streams are then de-multiplexed off of the carriers at the receiver (e.g., CPE 106), and re-assembled, and the secondary content subsequently removed.

Network Server—

Figure 3:
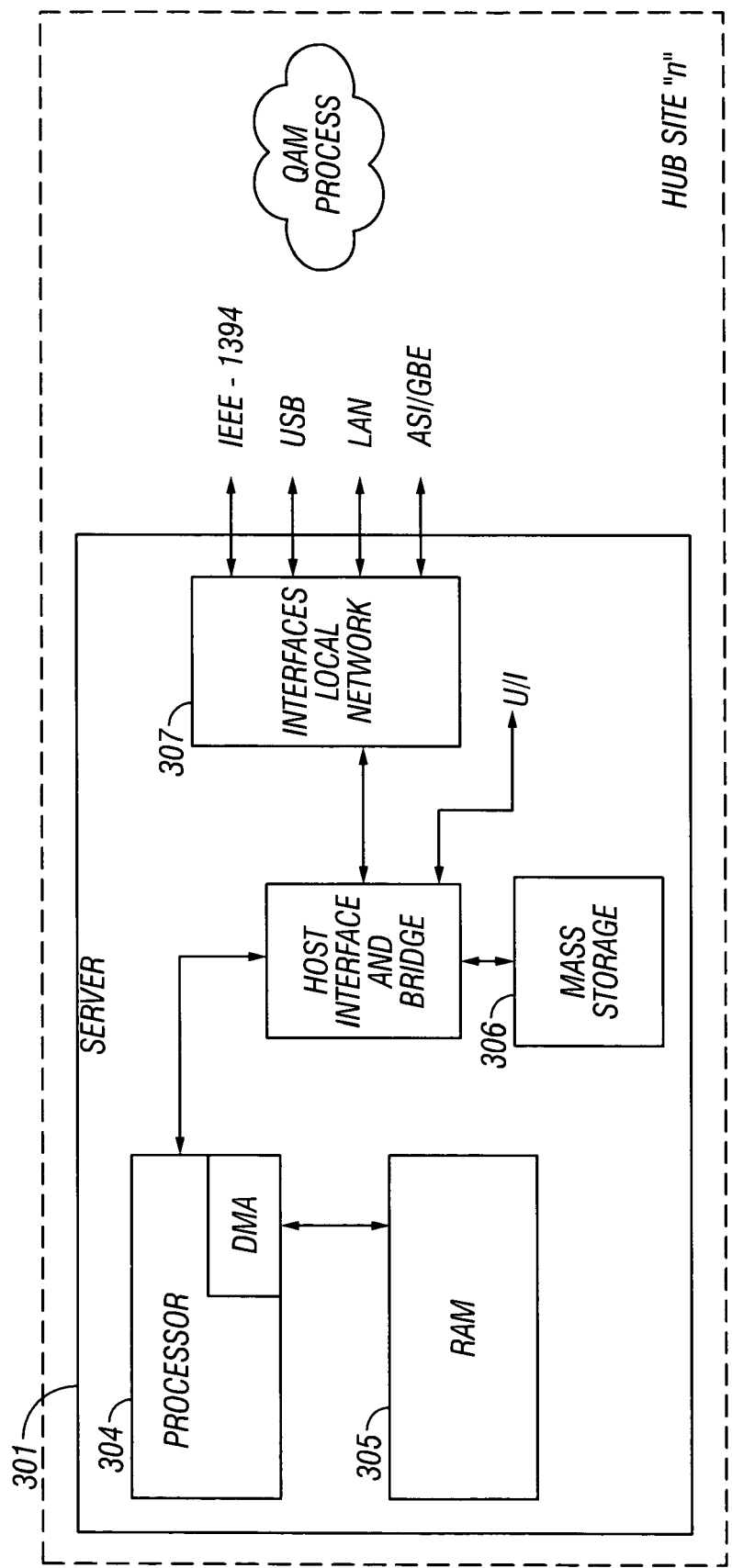
FIG. 3 is a functional block diagram illustrating an exemplary network device adapted for variable rate loading according to one embodiment of the invention.

Referring now to FIG. 3, one embodiment of the improved network server device with opportunistic secondary content loading (OSCL) capability according to the present invention is described. As shown in FIG. 3, the device 301 generally comprises and OpenCable-compliant server module adapted for use at the hub site(s) of FIG. 1c (e.g., the "BSA server" 196), although the server may comprise other types of devices (e.g., VOD or application servers) within the network and in communication with the OSCL process 271 of the QAMs, as previously described, or alternatively a dedicated network-wide (e.g., head-end) server in communication with the OSCL process 271. Myriad other configurations will be recognized by those of ordinary skill provided the present disclosure.

The server 301 comprises a digital processor(s) 304, storage device 306, and a plurality of interfaces 307 for use with other network apparatus such as the QAM modulator devices (see FIG. 4), BSA hub or edge switches 194, CMTS, IP routers and other packet network devices, network management and provisioning systems, local PCs, etc. Other components which may be utilized within the server device 301 include amplifiers, board level electronic components, as well as media processors and other specialized SoC or ASIC devices. Support for various processing layers and protocols (e.g., 802.3, DOCSIS MAC, UDP/IP, OOB channels, DHCP, SNMP, H.323/RTP/RTCP, VoIP, SIP, etc.) may also be provided as required, such as in support of data and program stream loading interchange between the server 301 and the QAM modulator 401. As shown in FIG. 2b, the head-end OSCL server process application 270 (if utilized) is disposed to run on a server module to provide a functional interface with the BSA process 272 on the BSA server 301 at the hub site (which itself is in communication with the QAM device 401 as previously described).

The server device 301 of FIG. 3 may take any number of physical forms, comprising for example one of a plurality of discrete modules or cards within a larger network hub site equipment of the type well known in the art. The server may also comprise firmware, either alone or in combination with other hardware/software components such as those previously described (e.g., disposed in the aforementioned QAM device). Alternatively, the server module 301 may be a stand-alone device disposed at the hub site or other location, and may even include its own data or optical interface so as to interface directly with various portions of the HFC network 101. Numerous other configurations may be used. The server device 301 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the program stream analysis, null data removal and secondary content loading functionality described above may take the form of one or more computer programs (e.g., the server and QAM processes 272, 271). Alternatively, such computer programs may have one or more components distributed across various hardware environments at the same or different locations, such as where the server process 272 is distributed across multiple platforms at the head-end 150 and the hub site.

As yet another example, portions of the functionality may be rendered as a dedicated or application specific IC having code running thereon. Myriad different configurations for practicing the invention will be recognized by those of ordinary skill in the network arts provided the present disclosure.

QAM Device—

Figure 4:
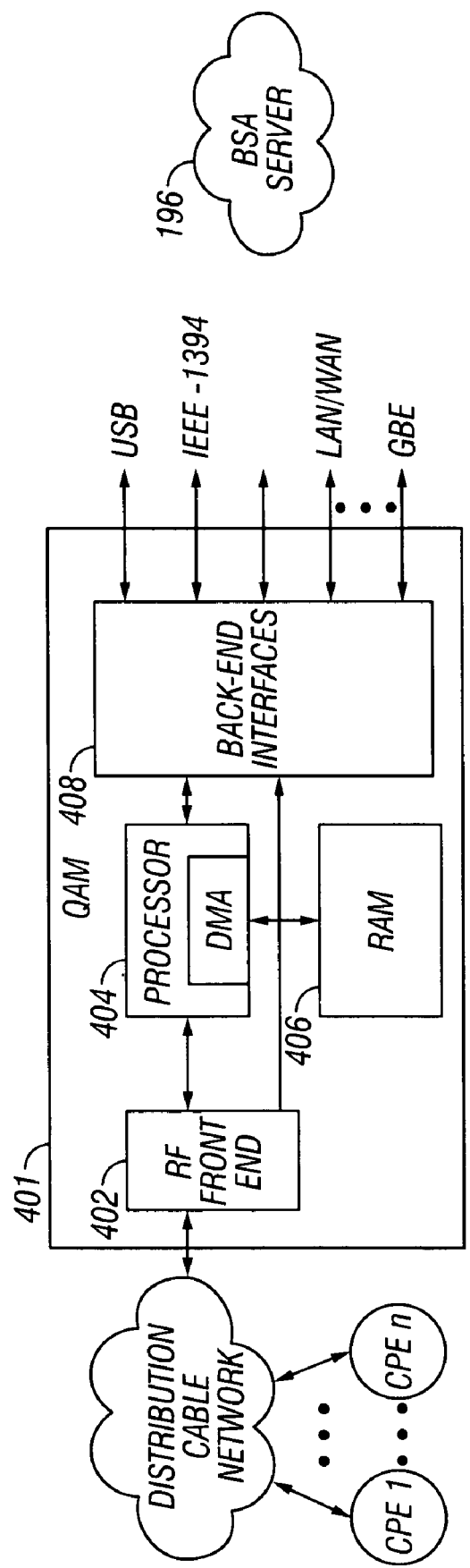
FIG. 4 is a functional block diagram illustrating an exemplary QAM modulator device adapted to perform variable rate stream unloading and secondary content loading according to the invention.

FIG. 4 illustrates an exemplary embodiment of the improved QAM device 401 according to the present invention. This QAM device ("edge QAM"), inter alia, maps from multicast IP to RF output carrier under the control of the Session Resource Manager and BSA Resource Manager. In the exemplary embodiment, the QAM joins multicast groups using IGMP signaling. It has the ability to deliver a single incoming multicast stream to multiple output ports.

In one exemplary embodiment, the QAM device 401 comprises a modified Scientific Atlanta Model D9479 Gigabit QAM (G-QAM), although it will be recognized that other devices may be used with equal success.

As shown in the simplified diagram of FIG. 4, the device 401 generally comprises computerized system having an RF front end 402 (including quadrature amplitude modulation (QAM) modulators) for interface with the downstream portions of the network 101 of FIGS. 1-1c. For example, the modulator of the exemplary Scientific Atlanta device comprises a QAM-256 (256 constellation point) modulator having 6 MHz frequency bandwidth at 5.36 Msps and 38.8 Mbps data rate, although other frequency bandwidths (e.g., 8 MHz) and modulations (e.g., QAM-64) may be used with equal success, depending on the particular application.

Digital processor(s) 404, storage device 406, and a plurality of interfaces 408 (e.g., Type-F connectors, GBE/RJ45, video/audio interfaces, IEEE-1394 "Firewire", USB, serial/parallel ports, etc.) for interface with other hub site or server apparatus such as BSA servers 196, etc. are also included within the QAM device 401. Other components which may be utilized include various protocol layers (e.g., MAC, PHY, etc.), encryption algorithms (e.g., AES, DES, or DVB "Powerkey"), as well media processors and other specialized SoC or ASIC devices. These additional components and functionality are well known to those of ordinary skill in the cable and embedded system fields, and accordingly not described further herein.

The illustrated embodiment of the QAM device 401 further includes the OSCL software process 271 as shown in FIG. 2b and previously described herein. Specifically, the OSCL process comprises a software program running on the QAM 401 (or a connected processing entity) that communicates with the head-end server process 270 and/or the BSA server process 272 in order to determine the "target" secondary content bit rate ($B_{ts}$) for the selected program streams. Communication between the server processes 270, 272 and the QAM process 271 may occur using any number of different mechanisms known to those of ordinary skill in the network arts including, e.g., packetized upstream/downstream protocols over in-band or OOB channels.

CPE—

Figure 5:
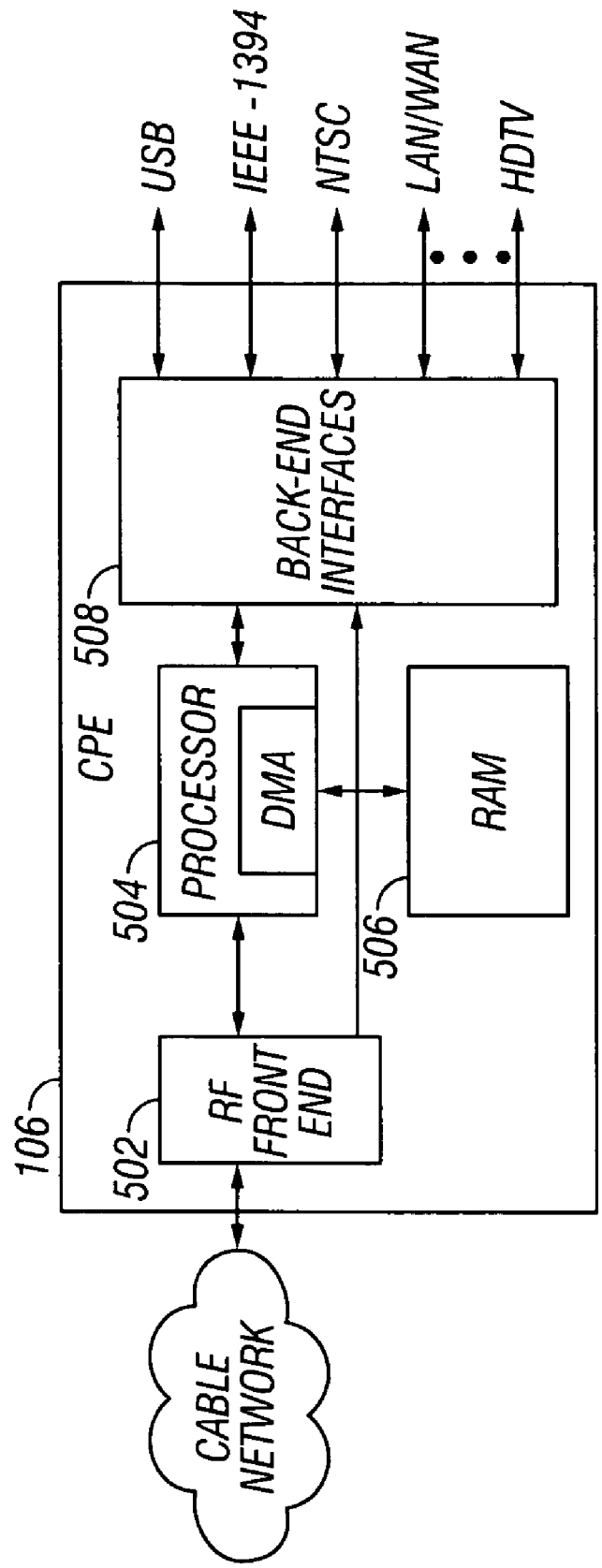
FIG. 5 is a functional block diagram illustrating an exemplary consumer premises adapted to identify and extract secondary content from program streams.

FIG. 5 illustrates an exemplary embodiment of the improved CPE 106 according to the present invention. As shown in the simplified diagram of FIG. 5, the device 106 generally comprises and OpenCable-compliant embedded system having an RF front end 502 (including tuner, demuxer and demodulator/decryptors) for interface with the HFC network 101 of FIGS. 1-1c, digital processor(s) 504, storage device 506, and a plurality of interfaces 508 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 5 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 5 is also provided with an OCAP 1.0-compliant application and Java-based middleware which, inter alia, manages the operation of the device and applications running thereon (including the client process application 274). It will be recognized by those of ordinary skill that myriad different device and software architectures may be used consistent with the tuning functions of the present invention, the device of FIG. 5 being merely exemplary. For example, different middlewares (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc. In one embodiment, the Watch TV application further comprises all necessary functionality need to support the client process 274, which includes identification, extraction, and processing of the secondary content received via the tuner interface.

The client process 274 for secondary content identification, extraction and removal may also be implemented in the form of a separate application, as part of the middleware, or even as a process on a connected device. For example, in another variant, the CPE comprises a cable modem (CM) which is used to receive and process the secondary data, such as via a designated UDP port or MAC address.

Operations/Business Rules Engine—

In another aspect of the invention, the aforementioned BSA server process 272 (e.g., rendered as one or more computer programs) can also utilize a "business rules" engine of the type described in U.S. patent application Ser. No. 11/243,720 filed Oct. 4, 2005 and entitled "SELF-MONITORING AND OPTIMIZING NETWORK APPARATUS AND METHODS", previously incorporated herein. This engine comprises, in an exemplary embodiment, a series of software routines running on the BSA server device 196, head-end server, or other associated hardware/firmware environment adapted to control the operation of the secondary content insertion algorithms previously described. These rules may also be fully integrated within the server process 272 itself, and controlled via e.g., a GUI on a PC connected to the server 196.

In effect, the business rules engine comprises a supervisory entity which monitors and selectively controls, via the server process 272, the secondary content insertion control functions at a higher level, so as to implement desired operational or business rules. The rules engine can be considered an overlay of sorts to the secondary content insertion algorithms of the server process 272 previously described. However, in the context of the OSCL algorithms of the present invention, one embodiment of the rules engine is further configured to set the secondary content target rate $B_{ts}$ in view of one or more business considerations or rules. For example, the server process 272 may call for insertion of a first type of secondary content based on its position in queue (e.g., FIFO approach), carousel, etc. The business rules engine may decide that it is more important (from a consumer satisfaction and/or profitability standpoint) that certain types of secondary content take priority over others (e.g., those that are anticipated to be needed by the subscriber in the immediate future, such as EPG updates), irrespective of their queue or carousel position.

Or, the business rules engine may be programmed to relegate files or data structures above a certain size threshold to the back of the queue or another transport mechanism altogether, since they will take a protracted period of time to download via the secondary insertion approach.

Hence, the business rules engine would over-ride the "recommendation" provided by the server process 272, and can also optionally adjust accordingly on a dynamic basis (such as based on time of day, available bandwidth, level of demand for certain programming, data received from certain CPE, etc.).

Similarly, there may be over-riding circumstances which would allow a greater profitability or revenue from allocating the vacated bandwidth that would have been used for one type of secondary content to another type.

Another rule might allow for the adjustment of the frequency and/or conditions of when the secondary content insertion rules can be varied. For example, a higher level of granularity in secondary insertion rate variations may be desired to permit the fastest possible download (as opposed to more coarse increments of rate change).

The rules engine (or server process 272) may also be configured to perform speculative or look-ahead functions, such as where the head-end process communicates null data insertion rates well in advance of the actual insertion, and the server process 272 selectively chooses between vacated bandwidth windows, or evaluates the sufficiency of a given window for insertion of time-sensitive content. For example, the server process may determine that sufficient contiguous vacated bandwidth is available to allow for streaming of a short video segment.

Many other approaches and combinations are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. Modulator apparatus configured for use in a broadcast switched digital network, said network having a distribution network in communication therewith and being configured to carry a plurality of program streams, said apparatus comprising:
    a processor;
    a storage device in data communication with said processor;
    a network interface configured to receive a plurality of variable rate program streams from said distribution network; and
    a computer program operative to run on said modulator apparatus, said computer program being configured to:
        receive said plurality of variable rate program streams;
        insert secondary content along with said obtained variable rate streams, said insertion comprising either:
            insertion of at least time-sensitive secondary content, it is determined that a temporal requirement associated therewith can be accommodated; and
            insertion of non-time sensitive secondary content comprising at least one of an application program file, an image data file, or an audio data file if the temporal requirement cannot be met; and
        transmit said variable bit rate streams and said secondary content to a plurality of client devices downstream of said modulator apparatus;
        wherein an amount of secondary content for insertion is based at least in part on a calculation of a difference between rates of said variable rate program streams and a maximum rate for said network.

2. The modulator apparatus of claim 1, wherein said transmission of said variable rate streams is performed using quadrature amplitude modulation (QAM).

3. The modulator apparatus of claim 1, wherein said loaded program streams comprise a plurality of content packets and at least one null packet, and said computer program is configured to identify said null data based on a packet header of said at least one null packet.

4. The modulator apparatus of claim 1, wherein said received plurality of variable rate program streams comprise null packets.

5. The modulator apparatus of claim 4, wherein said computer program is configured to insert said secondary content by:
    determination of an amount of said null packets in at least one of said variable rate program streams;
    removal said null packets from said at least one variable rate program stream; and
    insertion said secondary content in place of said at least portion of said null packets into said at least one stream.

6. The modulator apparatus of claim 1, wherein said insertion of said secondary content is such that said transmission of said variable bit rate streams and said secondary content comprises transmission of a substantially constant data rate program stream composed thereof.

7. The modulator apparatus of claim 1, wherein said secondary content comprises non-time sensitive data selected from the group consisting of: (i) application program files; (ii) image data files, or (iii) audio data files.

8. The modulator apparatus of claim 1, wherein said secondary content comprises time-sensitive data, and said processing apparatus is configured to determine in advance of said insertion of said time-sensitive data whether a temporal requirement associated with said time-sensitive data can be accommodated.

9. The modulator apparatus of claim 1, wherein said transmission of said variable bit rate streams and said secondary content to a plurality of client devices downstream of said modulator apparatus is performed via said distribution network.

10. Modulator apparatus for use in a content delivery network configured to provide a plurality of program streams to a plurality of client devices, said apparatus comprising:
    a processor;
    a storage device in data communication with said processor;
    a network interface configured to receive a plurality of program streams from a distribution network of said content delivery network, said program streams comprising streams having null data and variable rates; and a computer program operative to run on said processor, said computer program configured to:

substitute secondary data for at least a portion of said null data within said program streams, an amount of said secondary data substituted being based at least in part on a difference between said variable rates and a maximum rate for said network: said substitution comprising:

substitution of at least time-sensitive secondary data if it is determined that a temporal requirement associated with said time-sensitive secondary data can be accommodated; or substitution of non-time sensitive secondary data files if the at least one temporal requirement cannot be met;

and transmit said variable bit rate streams and said secondary data to said plurality of client devices.

11. The modulator apparatus of claim 10, wherein said content delivery network comprises a broadcast switched digital network.

12. The modulator apparatus of claim 10, wherein said secondary data comprises locally generated content.

13. The modulator apparatus of claim 10, wherein the variable rate bit streams and secondary content together comprise a substantially constant bit rate for transmission.

14. A method for transmission of content to a plurality of client devices in a content distribution network, said method comprising:

receiving at a modulator apparatus a plurality of variable rate program streams;

inserting secondary content along with said variable rate streams, an amount of secondary content for insertion based at least in part on a calculation of a difference between rates of said variable rate program streams and a maximum rate for said network, said act of inserting comprising:

determining whether a temporal requirement associated with time sensitive secondary content can be met and if so, inserting said time sensitive content; and if said temporal requirement cannot be met, inserting non-time sensitive secondary content; and transmitting substantially constant bit rate streams from said modulator apparatus to said plurality of client devices, said substantially constant bit rate streams comprising respective ones of said variable bit rate streams and at least a portion of said secondary content.

15. The method of claim 14, wherein said method wherein said network comprises a broadcast switched digital network having a distribution network in communication therewith.

16. The method of claim 14, wherein said transmitting of said constant rate streams is performed using quadrature amplitude modulation (QAM).

17. The method of claim 14, wherein said secondary content comprises content generated for consumption by ones of said client devices disposed in a prescribed geographic area.

18. The method of claim 14, wherein said receiving a plurality of variable rate program streams comprises receiving a plurality of constant rate streams comprised of said variable rate program streams and null data.

19. The method of claim 18, wherein said inserting of said secondary content comprises removal of said null data and replacement with said secondary content.

20. A method for delivery of content to one or more client devices in a network, said method comprising:

receiving at a modulator apparatus a plurality of constant rate program streams, each of said constant rate streams comprising at least one variable rate stream and a plurality of null packets;

said modulator apparatus removing said plurality of null packets from said at least one variable rate stream;

said modulator apparatus adding secondary data to said at least one variable rate stream; an amount of secondary data added based at least in part on a calculation of a difference between rates of said at least one variable rate program stream and a maximum rate for said network; and delivering at least one substantially constant bit rate stream from said modulator apparatus to said one or more client devices, said at least one substantially constant bit rate stream comprising said at least one variable bit rate stream and said secondary data;

wherein said secondary data comprises at least one of (i) time sensitive data, said time sensitive data having at least one temporal requirement associated therewith, and (ii) non-time sensitive application program file data, image file data, or audio file data; and wherein said method further comprises evaluating whether said at least one temporal requirement can be met before adding said time-sensitive data, if said at least one temporal requirement cannot be met, adding said non-time sensitive data.

21. The method of claim 20, wherein said method occurs substantially at a local node of a content delivery network, and said secondary data comprises content generated for consumption by client devices within an area local to said local node.

22. The method of claim 21, wherein said act of removing said plurality of null packets comprises identifying a packet header of each of said null packets.

23. The method of claim 20, further comprising evaluating whether said at least one temporal requirement can be met before adding said time-sensitive data.

24. A non-transitory computer readable medium for use in a digital distribution network, said network being configured to carry a plurality of program streams, said computer readable medium comprising a plurality of instructions which when executed:

receive variable rate data having stuffing data associated therewith, said variable rate data and said stuffing data forming a substantially constant rate stream;

remove at least a portion of said stuffing data from said substantially constant rate stream;

identify secondary data for combination with said variable rate data;

calculate a difference between a rate of said variable rate data and a limitation rate associated with said network;

combine said secondary data with said variable rate data based at least in part on said calculated difference to create a second substantially constant rate stream; and deliver said second substantially constant rate stream one or more client devices in said network;

wherein said secondary data comprises at least one of non-time sensitive data and time sensitive data, said non-time sensitive data comprising at least one of application program file data, image file data file, and audio file data; and wherein if said second content comprises time sensitive data, said identification of secondary data further comprising determining whether a time-related requirement associated with said time sensitive data can be supported, if said time-related requirement cannot be supported insert said non-time sensitive data.

25. The non-transitory computer readable medium of claim 24, wherein said second content comprises non-time sensitive data selected from the group consisting of: (i) application program files; (ii) image data files, or (iii) audio data files.

26. The non-transitory computer readable medium of claim 25, wherein said secondary content comprises time-sensitive data, and said plurality of instructions are further configured to determine in advance Of said insertion of said time-sensitive data whether a quality of service (QoS) related requirement associated with said time-sensitive data can be accommodated.

27. Modulator apparatus for use in a digital content distribution network configured to carry a plurality of program streams, said apparatus comprising:
  processor means;
  a storage device in data communication with said processor means; means for interfacing with said distribution network; and
  logic means in communication with said means for interfacing and said processor and operative to:
  receive said plurality of variable rate program streams;
  calculate of a difference between rates of said variable rate program streams and a maximum rate for said distribution network;
  insert secondary content along with said obtained variable rate streams to form combined streams, said insertion of secondary content being based at least in part on said calculation, and said insertion comprising:
  insertion of at least time-sensitive data id at least one temporal requirement associated therewith may be accommodated; and
  insertion of non-time sensitive data files if said at least one temporal requirement cannot be accommodated, said non-time sensitive files including at least one of application program file data, image file data, and audio file data; and
  transmit said combined streams to a plurality of client devices downstream of said modulator apparatus.

28. The modulator apparatus of claim 27, wherein said secondary content comprises non-time sensitive data selected from the group consisting of: (i) application program files; (ii) image data files, or (iii) audio data files.

29. The modulator apparatus of claim 27, wherein said secondary content comprises time-sensitive data, and said processing apparatus is configured to determine in advance of said insertion of said time-sensitive data whether a quality of service (QoS) related requirement associated with said time-sensitive data can be accommodated.

30. Modulator apparatus for use in a content delivery network, said apparatus configured to provide a plurality of program streams to a plurality of client devices, said apparatus comprising:
  a processor;
  a storage device in data communication with said processor;
  a network interface configured to receive a plurality program streams from a distribution network of said content delivery network, said program streams comprising streams having variable rates; and
  a computer program operative to run on said processor, said computer program being configured to insert secondary data within at least one of said program streams, an amount of said secondary data inserted being based at least in part on a difference between at least one of said variable rates and a maximum rate associated with said network, said computer program comprising:
  first logic configured to insert time-sensitive secondary data if it is determined that a temporal requirement associated with said time-sensitive secondary data can be met; and
  second logic for inserting non-time sensitive secondary data files at least when said temporal requirement cannot be met.

* * * * *

UNITED STATES PATENT AND TRADEMARK OFFICE
CERTIFICATE OF CORRECTION

PATENT NO. : 7,889,765 B2
APPLICATION NO. : 11/291328
DATED : February 15, 2011
INVENTOR(S) : Paul D. Brooks et al.

It is certified that error appears in the above-identified patent and that said Letters Patent is hereby corrected as shown below:

Column 31, Lines 3-7 delete
"substitute secondary data for at least a portion of said null data within said program streams, an amount of said secondary data substituted being based at least in part on a difference between said variable rates and a maximum rate for said network: said substitution comprising:"

Column 31, Lines 3-7 insert
-- substitute secondary data for at least a portion of said null data within said program streams, an amount of said secondary data substituted being based at least in part on a difference between said variable rates and a maximum rate for said network, said substitution comprising: --

Column 32, Lines 3-7 delete
"said modulator apparatus adding secondary data to said at least one variable rate stream; an amount of secondary data added based at least in part on a calculation of a difference between rates of said at least one variable rate program stream and a maximum rate for said network;"

Column 32, Lines 3-7 insert
-- said modulator apparatus adding secondary data to said at least one variable rate stream, an amount of secondary data added based at least in part on a calculation of a difference between rates of said at least one variable rate program stream and a maximum rate for said network; --

Column 33, Lines 3-9 delete
"26. The non-transitory computer readable medium of claim 25, wherein said secondary content comprises time-sensitive data, and said plurality of instructions are further configured to determine in advance Of said insertion of said time-sensitive data whether the quality of service (QoS) related requirement associated with said time-sensitive data can be accommodated."

Signed and Sealed this
Ninth Day of August, 2011

David J. Kappos
*Director of the United States Patent and Trademark Office*

CERTIFICATE OF CORRECTION (continued)
U.S. Pat. No. 7,889,765 B2

Column 33, Lines 3-9 insert
-- 26. The non-transitory computer readable medium of claim 25, wherein said secondary content comprises time-sensitive data, and said plurality of instructions are further configured to determine in advance of said insertion of said time-sensitive data whether the quality of service (QoS) related requirement associated with said time-sensitive data can be accommodated. --

Column 33, Lines 14-16 delete
"a storage device in data communication with said processor means; means for interfacting with said distribution network; and"

Column 33, Lines 14-16 insert
-- a storage device in data communication with said processor means;
means for interfacing with said distribution network; and --